(12) United States Patent
Laurita

(10) Patent No.: US 8,967,578 B2
(45) Date of Patent: Mar. 3, 2015

(54) METHOD AND APPARATUS FOR SWIVEL DEVICE

(71) Applicant: Joseph N. Laurita, Wayne, NJ (US)

(72) Inventor: Joseph N. Laurita, Wayne, NJ (US)

( * ) Notice: Subject to any disclaimer, the term of this patent is extended or adjusted under 35 U.S.C. 154(b) by 58 days.

(21) Appl. No.: 14/038,999

(22) Filed: Sep. 27, 2013

(65) Prior Publication Data

US 2014/0021762 A1 Jan. 23, 2014

Related U.S. Application Data

(63) Continuation of application No. 13/740,691, filed on Jan. 14, 2013, now Pat. No. 8,544,809, and a continuation-in-part of application No. 13/483,396, filed on May 30, 2012, now abandoned.

(51) Int. Cl.
*A47B 91/00* (2006.01)
*A47C 3/18* (2006.01)
*A47C 7/00* (2006.01)
*F16M 13/02* (2006.01)

(52) U.S. Cl.
CPC ............... *A47C 3/18* (2013.01); *A47B 91/005* (2013.01); *A47C 7/002* (2013.01); *F16M 13/022* (2013.01)
USPC ............... 248/346.06; 248/346.01; 248/415; 248/349.1

(58) Field of Classification Search
CPC .................. A48B 11/00; B61D 33/0085
USPC .............. 248/425, 349.1, 346.1, 346.06, 415, 248/486.1, 521; 297/344.21, 344.26, 297/256.12
See application file for complete search history.

(56) References Cited

U.S. PATENT DOCUMENTS

| | | | |
|---|---|---|---|
| 3,572,861 A | | 3/1971 | Rogers et al. |
| 3,718,365 A | | 2/1973 | Gibson |
| 3,938,857 A | * | 2/1976 | Craig .................. 297/263.2 |
| 4,401,287 A | * | 8/1983 | Moeser .................. 248/425 |
| 4,482,184 A | | 11/1984 | Mincey |
| 4,705,256 A | | 11/1987 | Hofrichter |
| 4,733,903 A | | 3/1988 | Bailey |
| 4,842,335 A | | 6/1989 | Wunderlich |
| 4,919,383 A | * | 4/1990 | Benjamin et al. ......... 248/349.1 |
| 4,936,629 A | * | 6/1990 | Young ................. 297/256.12 |
| 4,969,685 A | | 11/1990 | Chihaya et al. |
| 5,078,451 A | | 1/1992 | Sobel |
| 5,567,014 A | | 10/1996 | Fitch |
| 5,568,960 A | | 10/1996 | Oleson et al. |
| 5,580,129 A | * | 12/1996 | Findlay .................. 297/344.21 |
| 5,599,065 A | | 2/1997 | Gryp et al. |
| 5,720,462 A | | 2/1998 | Brodersen |
| 5,779,309 A | * | 7/1998 | Lu .................. 297/344.26 |
| 5,782,451 A | * | 7/1998 | Carnahan et al. ......... 248/425 |
| 5,795,028 A | | 8/1998 | Dussia et al. |

(Continued)

*Primary Examiner* — Monica Millner
(74) *Attorney, Agent, or Firm* — Walter J. Tencza, Jr.

(57) ABSTRACT

A swivel device on which a chair can be secured, and which is configured to allow the easy elimination or reduction of accumulated dirt and/or sand. The swivel device may include a mounting device, and a base, wherein the mounting device is connected to the base so that the mounting device can rotate with respect to the base. The swivel device may further include a device for keeping a chair stationary on the mounting device, a first cavity located between the mounting device and the base, and a device for aiding rotation of the mounting device with respect to the base located in the first cavity. There may be a first opening of the mounting device leading to the first cavity, leading to a first opening of the base, which leads to an area outside of the swivel device. The swivel device accommodates all straight and lounge chairs.

2 Claims, 23 Drawing Sheets

(56) References Cited

U.S. PATENT DOCUMENTS

| | | | |
|---|---|---|---|
| 5,857,744 A * | 1/1999 | LaPointe et al. | 297/344.22 |
| 6,315,360 B1 * | 11/2001 | Guerrini | 297/344.21 |
| RE37,927 E | 12/2002 | Fitch | |
| 6,557,919 B2 | 5/2003 | Suga | |
| 6,575,532 B2 * | 6/2003 | Almerico | 297/344.26 |
| 6,890,033 B1 * | 5/2005 | Casella | 297/344.21 |
| 6,896,330 B1 | 5/2005 | Yu | |
| 6,997,512 B1 | 2/2006 | Yu | |
| 7,159,940 B1 * | 1/2007 | Atkins | 297/242 |
| 7,325,875 B1 | 2/2008 | Guerrini | |
| 7,328,952 B2 | 2/2008 | Guerrini | |
| 7,806,380 B2 | 10/2010 | Faull et al. | |
| 7,891,629 B2 | 2/2011 | Moyers | |
| 7,950,740 B2 | 5/2011 | Bunea et al. | |
| 8,167,374 B2 | 5/2012 | Findlay | |
| 2001/0032916 A1 | 10/2001 | Wess et al. | |
| 2002/0185902 A1 | 12/2002 | Almerico | |
| 2003/0164637 A1 * | 9/2003 | Ko | 297/344.26 |
| 2007/0241601 A1 | 10/2007 | Guerrini | |
| 2008/0030058 A1 | 2/2008 | Youngblood | |
| 2008/0093909 A1 | 4/2008 | Deng | |
| 2008/0224522 A1 | 9/2008 | Taguchi | |
| 2010/0019550 A1 * | 1/2010 | Cook et al. | 297/183.1 |
| 2010/0038934 A1 | 2/2010 | Bennett | |
| 2010/0253123 A1 | 10/2010 | Decraene | |
| 2011/0109135 A1 * | 5/2011 | Davis et al. | 297/217.4 |
| 2011/0109141 A1 * | 5/2011 | Molnar | 297/344.21 |
| 2011/0163586 A1 | 7/2011 | Findlay | |
| 2012/0235457 A1 | 9/2012 | Laurita | |
| 2012/0256459 A1 * | 10/2012 | Nilsson et al. | 297/344.21 |
| 2012/0286554 A1 | 11/2012 | Moon | |
| 2013/0113258 A1 | 5/2013 | Slungare et al. | |

* cited by examiner

Fig. 14A
Fig. 14B
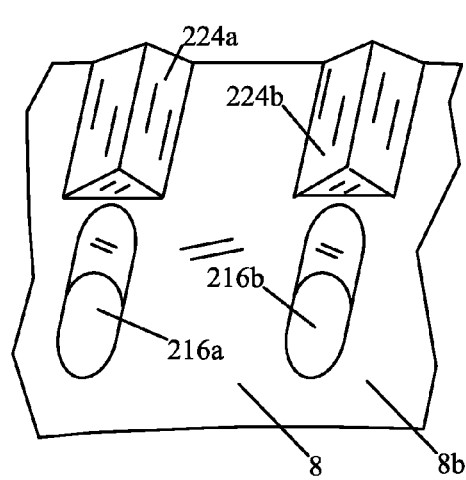
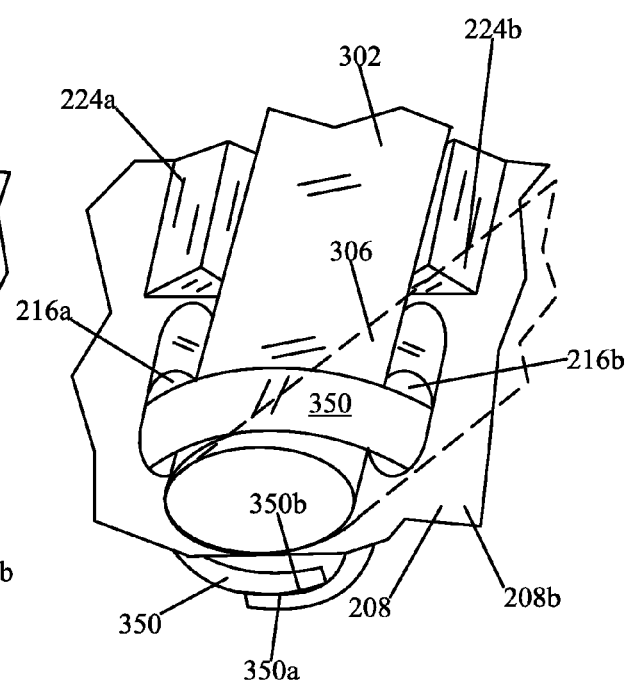

Fig. 21A
Fig. 21B
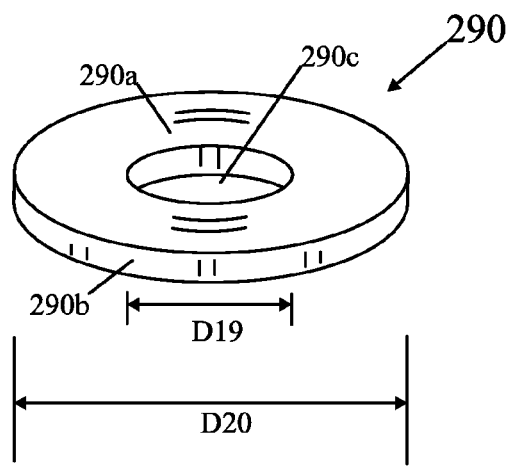
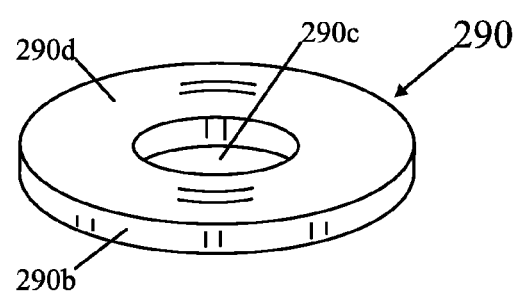
Fig. 22A
Fig. 22B
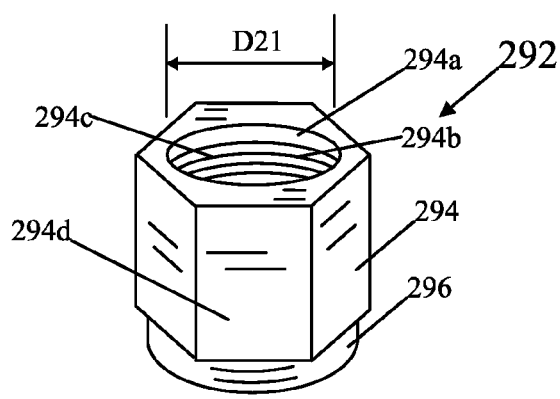
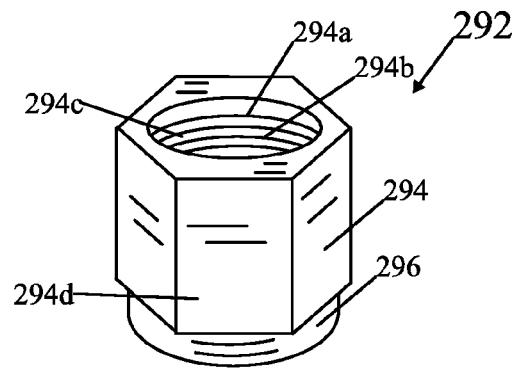

METHOD AND APPARATUS FOR SWIVEL DEVICE

CROSS REFERENCE TO RELATED APPLICATION(S)

This application is a continuation of and claims the priority of U.S. patent application Ser. No. 13/740,691 titled "METHOD AND APPARATUS FOR SWIVEL DEVICE", filed on Jan. 14, 2013, which is a continuation in part of and claims the priority of U.S. patent application Ser. No. 13/483,396, titled "METHOD AND APPARATUS FOR SWIVEL DEVICE", filed on May 30, 2012, such that this present application claims the priority of both Ser. Nos. 13/740,691 and 13/483,396.

FIELD OF THE INVENTION

This invention relates to improved methods and apparatus concerning mounting chairs.

BACKGROUND OF THE INVENTION

The general concept of mounting a chair onto a device which swivels is known in the art. For example, U.S. Pat. No. 7,328,952 to Guerrini discloses a saddle 12 which rotates with respect to a platform 14 about a vertical axis. (Guerrini '952, col. 2, Ins. 37-46; FIG. 1). Guerrini '952 further discloses the mounting of a beach chair 24 by use of mounting clips 20 to the saddle 12, thereby permitting rotation of the chair 24 with reference to the platform 14. (Id.) A friction reducing mechanism 96, including ball bearings 86, facilitate rotation of the saddle 12. (Guerrini '952, col. 3, Ins. 53-55; FIG. 1, and FIG. 8). Guerrini states that an annular seal 104 with an outwardly extending flange 106 prevents foreign matter, such as dirt, dust, and sand, from reaching bearings 86 thereby making bearings 86 maintenance free. (Guerrini '952, col. 3, In. 62-col. 4, In. 2; FIG. 1 and FIG. 8). Another patent to Guerrini, U.S. Pat. No. 7,325,875, discloses mounting a seat 12, onto a saddle 94 which rotates with respect to a platform 96, and an annular seal 194 to prevent dirt from reaching bearings 178. (Guerrini '875, col. 3, Ins. 39-47; col. 4, In. 65-col. 5, In. 5; FIG. 3). A third patent to Guerrini, U.S. Pat. No. 6,315,360 discloses fastening a chair 22 to a swivel apparatus 10 which includes a top ring 56 which freely rotates with respect to a bottom ring 52, ball bearings 62, and a dust cover 64 atop ring 56 to prevent dirt from fouling bearings 62. (Guerrini, '360 patent, col. 1, In. 66-col. 2, In. 5; col. 2, Ins. 30-42; FIGS. 1-3).

Each of the above Guerrini patents indicates that it prevents dirt or sand from reaching and/or fouling ball bearings. However, practically speaking, because the Guerrini devices can swivel, it is very difficult, if not impossible to prevent sand or dirt from reaching the ball bearings. This is especially true if the Guerrini devices are taken to a beach environment, where it is likely that sand will reach the ball bearings. When sand reaches the ball bearings it will make it more difficult and/or impossible for the Guerrini devices to swivel, thus effectively ruining operation of the devices.

SUMMARY OF THE INVENTION

One or more embodiments of the present invention provide an apparatus comprising a chair, a first section, and a second section. The chair may be configured to be detachably fixed to the first section. The first section may be configured to pivot with respect to the second section. The chair may have a first member; the first section may have a first clip; and the first member of the chair may be configured to be detachably fixed to the first clip.

The chair may have a second member which is spaced apart from the first member. The first section may have a second clip. The second member of the chair may be configured to be detachably fixed to the second clip while the first member is detachably fixed to the first clip. The chair may be a folding chair. The first section may include a circular disk. The second section may include a circular disk. The circular disk of the first section may be fixed with respect to the circular disk of the second section so that the circular disk of the first section rotates with respect to the circular disk of the second section. A plurality of balls may be located between the circular disk of the first section and the circular disk of the second section.

The apparatus may also include a third section, wherein the second section is fixed to the third section. The third section may include a top member and a plurality of posts which are substantially perpendicular to the top member. The third section may include first and second members which are substantially perpendicular to the plurality of posts and which are substantially parallel to the top member. The third section may include third and fourth members which are substantially parallel to the top member and which are substantially perpendicular to the plurality of posts and to the first and the second members. The first section may include first and second elongated members to which the chair can be detachably fixed. The first and second elongated members may be parallel to each other.

A method may be further provided including attaching a chair to a first section, so that the chair can be detached from the first section, wherein the first section is fixed to a second section so that the first section is configured to pivot with respect to the second section. Components previously specified for an apparatus may be provided for implementation of a method in one or more embodiments of the present invention.

One or more embodiments of the present invention provide an apparatus on which a chair can be mounted, which swivels, and which is configured to allow the easy elimination or reduction of accumulated dirt and/or sand.

In at least one embodiment of the present invention, an apparatus is provided comprising: a swivel device which includes a mounting device; a base, wherein the mounting device is connected to the base so that the mounting device can rotate with respect to the base, a device for keeping a chair stationary on the mounting device, a first cavity located between the mounting device and the base, and a device for aiding rotation of the mounting device with respect to the base located in the first cavity.

In at least one embodiment, there is a first opening of the mounting device, such that the first opening of the mounting device has an entrance at a first surface of the mounting device, passes through a body portion of the mounting device, has an exit at a second surface of the mounting device which opposes the first surface of the mounting device, and leads to the first cavity located between the mounting device and the base. The first cavity may lead to a first opening of the base. The first opening of the base may have an entrance at a first surface of the base, may pass through a body portion of the base, and may have an exit at a second surface of the base which opposes the first surface of the base, and leads to an area outside of the swivel device. The first cavity may have a volume, the first opening of the mounting device may have a volume, and the first opening of the base may have a volume, and the volume of the first cavity may be substantially greater than the volume of the first opening of the mounting device and the volume of the first opening of the base.

In at least one embodiment, the apparatus includes the combination of the swivel device and the chair which is secured to the swivel device so that the chair is stationary. The mounting device may be connected to the base so that the mounting device can rotate with respect to the base by a pivot pin and/or bolt which is centrally located with respect to both the mounting device and the base. The first opening of the mounting device may not be centrally located with respect to the mounting device; and the first opening of the base may not be centrally located with respect to the base.

In at least one embodiment there is a second opening of the mounting device, located at a different location from the first opening of the mounting device, such that the second opening of the mounting device has an entrance at the first surface of the mounting device, passes through the body portion of the mounting device, has an exit at the second surface of the mounting device which opposes the first surface of the mounting device, and leads to the first cavity located between the mounting device and the base. The first cavity may lead to a second opening in the base. In at least one embodiment, the second opening in the base has an entrance at the first surface of the base, passes through the body portion of the base, has an exit at the second surface of the base which opposes the first surface of the base, and leads to the area outside of the swivel device. The second opening of the mounting device may have a volume, and the second opening of the base may have a volume, and the volume of the first cavity may be substantially greater than the volume of the second opening of the mounting device and the volume of the second opening of the base.

In at least one embodiment the mounting device is connected to the base so that the mounting device can rotate with respect to the base by a pivot pin which is centrally located with respect to both the mounting device and the base. The first and the second openings of the mounting device may not be centrally located with respect to the mounting device; and the first and the second openings of the base may not be centrally located with respect to the base.

The device for aiding rotation of the mounting device with respect to the base located in the first cavity may include a plurality of bearing balls.

The swivel device may be further comprised of a first disc device, a second disc device, and a plurality of bearing balls. The first disc device may have a plurality of openings. There may be a one to one correspondence between the plurality of bearing balls and the plurality of openings in the first disc device, such that there is one bearing ball of the plurality of bearing balls sitting in each of the plurality of openings of the first disc device. The first disc device may sit on a first substantially circular wall of the second disc device so that there is a second cavity between the first disc device and the second disc device. The second cavity may be part of the first cavity; and the second disc device may be fixed to the base. The first disc device may be configured so that it can rotate with respect to the second disc device.

In at least one embodiment, the swivel device has a plurality of water passage openings, each of which has an entrance at a first surface of the first disc device, passes through a body portion of the first disc device, has an exit at a second surface of the first disc device which opposes the first surface of the first disc device, and leads to the second cavity located between the first disc device and the second disc device. The plurality of water passage openings of the swivel device may be distinct from the plurality of openings of the first disc device.

In at least one embodiment, the second disc device includes a second substantially circular wall which is substantially concentric with the first substantially circular wall. The first disc device may sit on both the first and the second substantially circular walls simultaneously, so that there is third cavity between the first disc device and the second disc device. The second cavity and the third cavity may be separated by the second substantially circular wall. The third cavity may be part of the first cavity.

A method is provided in at least one embodiment, which may include securing a chair in an upright position on a mounting device of a swivel device. The swivel device may be configured as previously described.

BRIEF DESCRIPTION OF THE DRAWINGS

FIG. 14A shows a top, front perspective magnified view of a solid triangular prism structure of the apparatus of FIG. 5;

FIG. 14B shows a top, front perspective magnified view of a solid triangular prism structure of the apparatus of FIG. 5, with a member of a leg of a chair;

FIG. 21A shows a top, front perspective view of a second washer of the apparatus of FIG. 5;

FIG. 21B shows a rear, bottom perspective view of the second washer of FIG. 21A;

FIG. 22A shows a top, front perspective view of a nut of the apparatus of FIG. 5;

FIG. 22B shows a top, rear perspective view of the nut of FIG. 22A;

DETAILED DESCRIPTION OF THE DRAWINGS

Figure 1A:
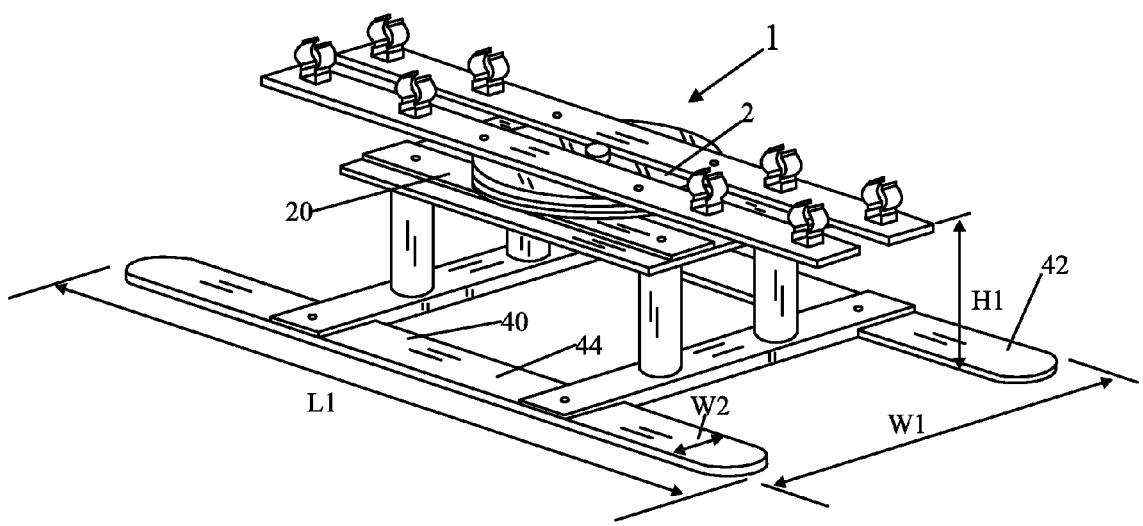
FIG. 1A shows a front, right side, top perspective view of a swivel apparatus in accordance with an embodiment of the present invention, with the swivel apparatus in an assembled state.
Figure 1B:
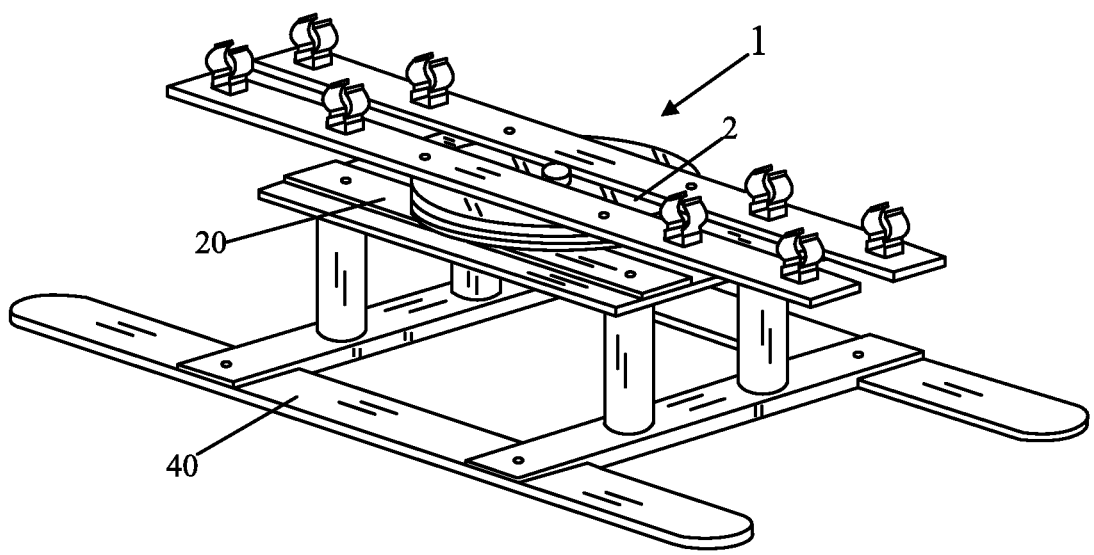
FIG. 1B shows a rear, left side, top perspective view of the swivel apparatus of FIG. 1A, with the swivel apparatus in an assembled state.
Figure 2A:
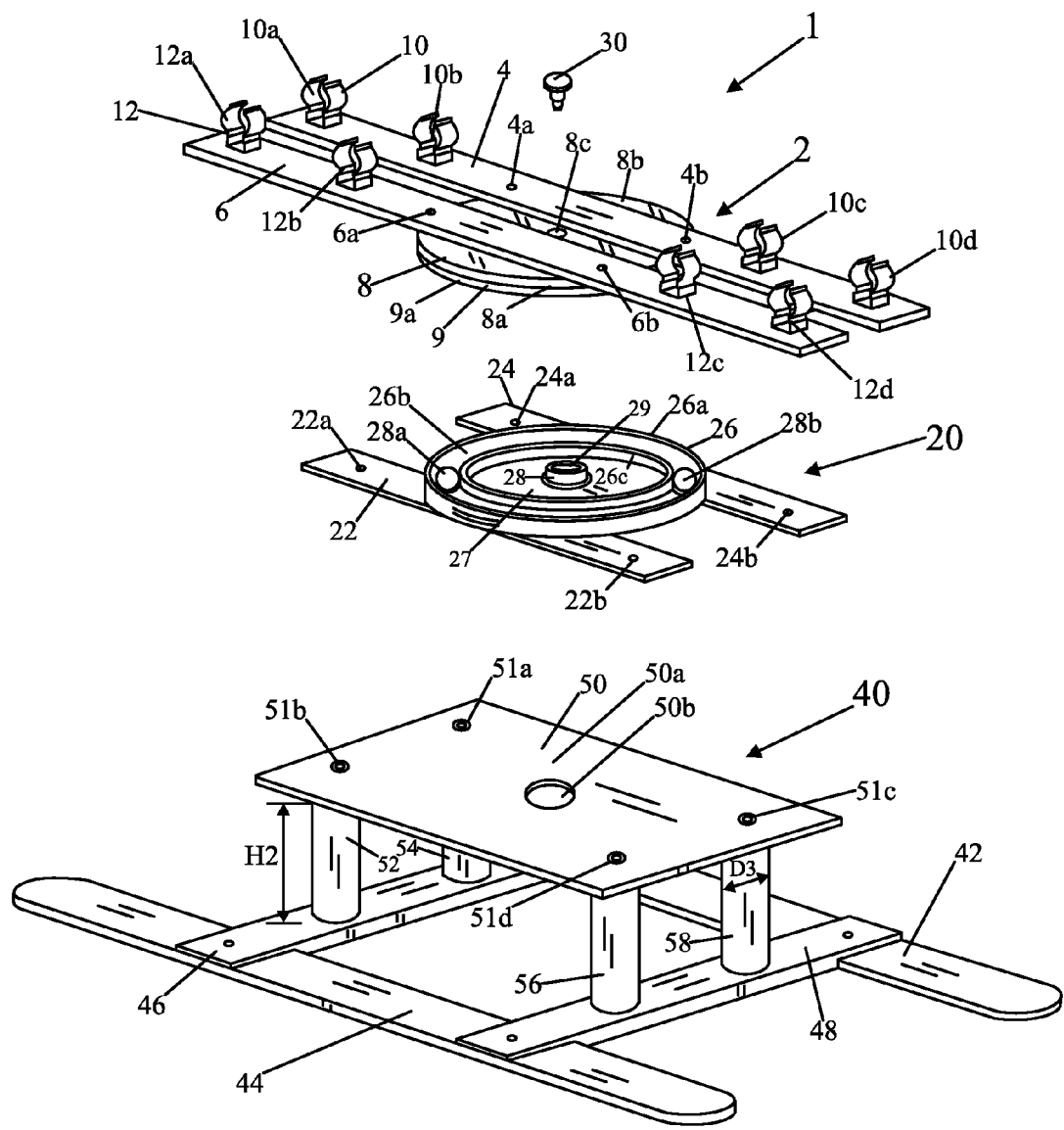
FIG. 2A shows a front, right side, top perspective view of the swivel apparatus of FIG. 1A, with the swivel apparatus in a taken apart state.
Figure 2B:
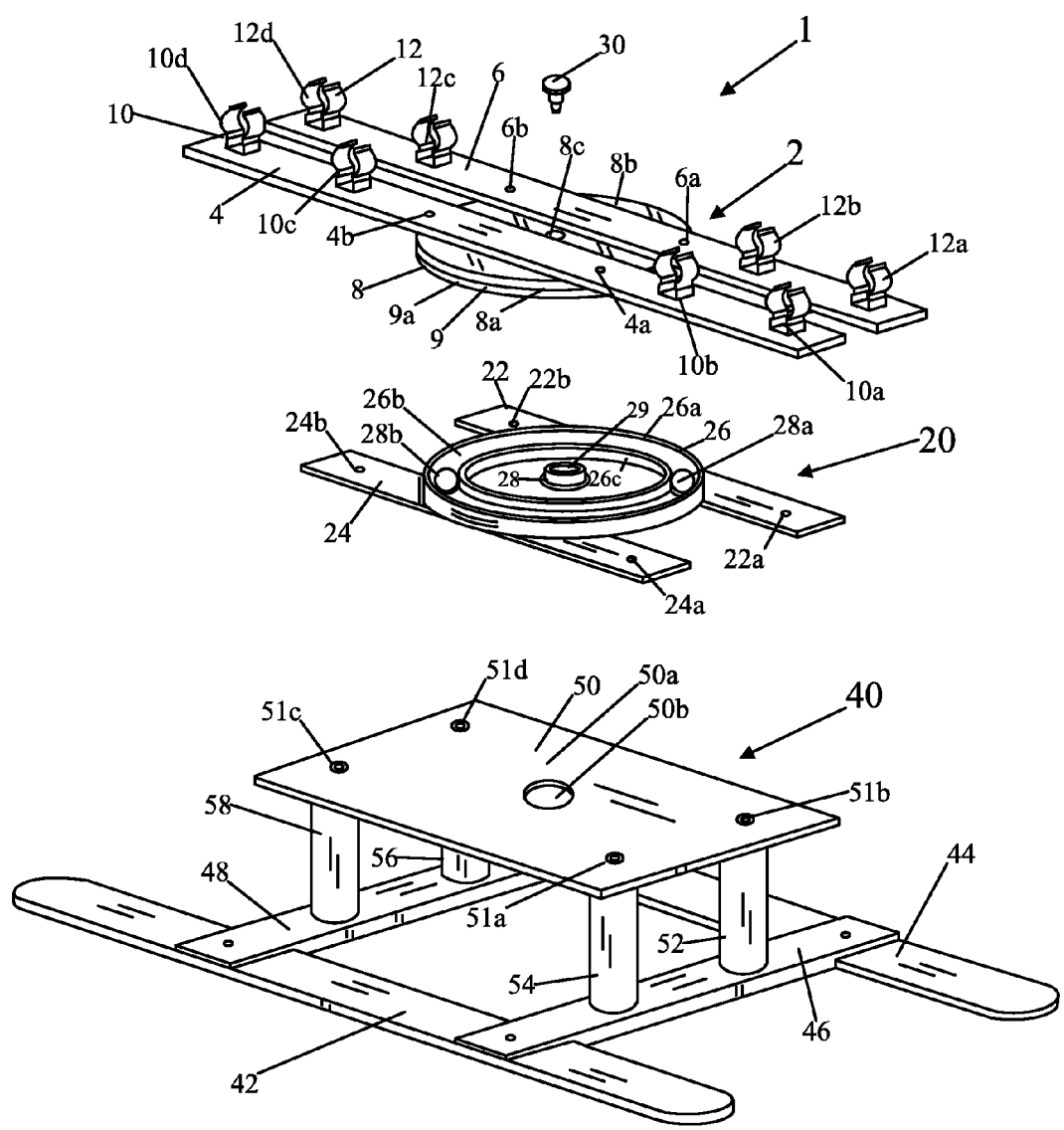
FIG. 2B shows a rear, left side, top perspective view of the swivel apparatus of FIG. 1A, with the swivel apparatus in a taken apart state.
Figure 3:
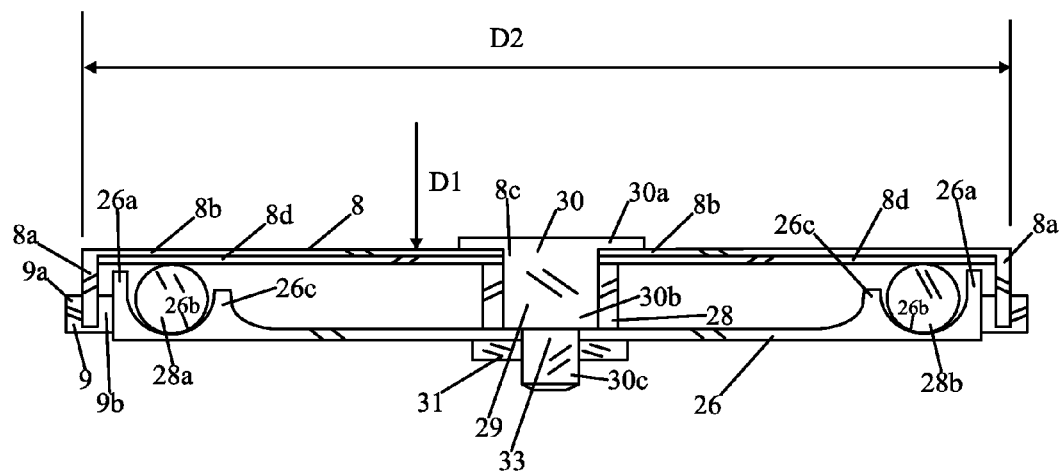
FIG. 3 shows a cross sectional view of a portion of the swivel apparatus of FIG. 1A.

FIG. 1A shows a front, right side, top perspective view of a swivel apparatus 1 in accordance with an embodiment of the present invention, with the swivel apparatus 1 in an assembled state. FIG. 1B shows a rear, left side, top perspective view of the swivel apparatus 1 of FIG. 1A, with the swivel apparatus 1 in an assembled state. FIG. 2A shows a front, right side, top perspective view of the swivel apparatus 1 of FIG. 1A, with the swivel apparatus 1 in a taken apart state. FIG. 2B shows a rear, left side, top perspective view of the swivel apparatus 1 of FIG. 1A, with the swivel apparatus 1 in a taken apart state. FIG. 3 shows a cross sectional view of a portion of the swivel apparatus 1 of FIG. 1A.

Referring to FIGS. 2A-2B, the swivel apparatus 1 includes sections 2, 20, and 40. The section 2 includes members 4 and 6. The section 2 further includes circular disk or member 8.

A plurality 10 of clips are fixed to the member 4 and a plurality 12 of clips are fixed to the member 6. Each of the members 4 and 6 may be a solid rigid beam, such as a solid wood or solid metal beam or plank. The plurality 10 of clips include clips 10a, 10b, 10c, and 10d; and the plurality 12 of clips include clips 12a, 12b, 12c, and 12d. The member 4 has openings and/or fasteners 4a and 4b through which the member 4 is fixed to the circular disk or member 8. The member 6 has openings and/or fasteners 6a and 6b through which the member 6 is fixed to the circular disk or member 8.

The circular disk or member 8 may be made of a solid rigid material such as wood or metal. The circular disk or member 8 may have a periphery 8a, a top surface 8b, and a central opening 8c. A rubber seal 9 having a peripheral surface 9a may be fixed to the periphery 8a, such as by an adhesive.

The section 20 includes members 24 and 22, and a circular member 26. The circular member 26 is fixed to the members 24 and 22. The member 24 includes openings 24a and 24b; and the member 26 includes openings 22a and 22b. The circular member 26 has a peripheral wall 26a, an inner wall 26c, and a curved surface 26b between the peripheral wall 26a and the inner wall 26c. Balls 28a and 28b lie on the curved surface 26b and can roll on the curved surface 26b around the inner wall 26c, and between the inner wall 26c and the peripheral wall 26a. The circular member 26 also includes a central support sleeve 28 having an opening 29. The support sleeve 28 is fixed to the surface 27 and the opening 29 runs through the surface 27.

The section 40 includes members 42, 44, 46, and 48. The member 42 may be fixed to the member 48 at a right angle or substantially at a right angle; the member 42 may be fixed to the member 46 at a right angle or substantially at a right angle; The member 44 may be fixed to the member 48 at a right angle or substantially at a right angle; and the member 44 may be fixed to the member 46 at a right angle or substantially at a right angle. Each of the members 42, 44, 46, and 48 may be made of a rigid material such as wood or metal.

The section 40 may include supports or posts 52, 54, 56, and 58. The supports or posts 52, 54, 56, and 58 may be made of a rigid material such as wood or metal. Each of the supports or posts 52 and 54 may be at a right angle with respect to the member 46; and each of the supports or posts 56 and 58 may be at a right angle with respect to the member 48.

The section 40 may include a top member or table top 50. The top member 50 may have a top surface 50a and a central opening 50b. The top member 50 may be fixed to the posts 52, 54, 56, and 58 by or through fasteners and/or openings 51a, 51b, 51c, and 51d.

The section 20 may be fixed to the section 40 by fixing the members 22 and 24 to the table top member 50 by aligning openings or fasteners 22a and 51b, 24a, and 51a, 22b and 51d, and 24b and 51c, and aligning opening 29 with opening 50b, at the same time. Fasteners may be used to fix the section 20 to the section 40 through openings 22a and 51b, 24a and 51a, 22b and 51d, and 24b and 51c.

The section 2 can be placed on top of the section 20 by placing the circular disk or member 8 over the circular disk or member 26 as shown by FIGS. 1A and 1B, and FIG. 3. As shown by FIG. 3, the circular disk 8 has been placed so that the peripheral wall 8a surrounds the peripheral wall 26a. The outer wall 9a of the seal 9 is shown in FIG. 3, and an inner wall 9b of the seal 9 between the peripheral wall 8a and the peripheral wall 26a is also shown. The seal 9 prevents material or debris from getting between the circular disk or member 8 and the circular disk or member 26.

As also shown in FIG. 3, the circular disk or member 8 includes an inner seal material 8*d* below the surface 8*b*. The balls 28*a* and 28*b* are shown in FIG. 3 fitting in the curved surface 26*b* between the wall 26*a* and the wall 26*c*. The inner seal material 8*d* rides on the balls 28*a* and 28*b*. The inner seal material 8*d* does not directly contact the wall 26*a*. The circular disk or member 8 can pivot or rotate about a pivot pin 30. The pivot pin 30 includes portions 30*a*, 30*b*, and 30*c*. The pivot pin 30 is held in place by a lock nut 31 shown in FIG. 3. The portion 30*a* prevents the pin 30 from falling through the opening 8*c* of the circular member 8. The portion 30*b* lies in opening 8*c* and in a central bore or opening 29 of the sleeve 28, and the portion 30*c* partly lies in an opening 33 in the disk 26, and in a central opening of the lock nut 31. In this manner the circular disk 8 may be pivotally fixed to the circular disk 26 to allow rotation about pivot pin 30.

As shown in FIG. 1A, the apparatus 1, when assembled, may have a length L1, which may be approximately thirty six inches, a width, W1, which may be approximately twenty-four inches, and a height H1 (not including height of clips 10 and 12), which may be approximately eight and three quarters inches.

The posts 52, 54, 56, and 58 may be made of aluminum. The members 42, 44, 46, and 48 may be made of wood. The inner seal material 8*d* may be made of plastic and may be a plastic liner. The seal 9 may be a plastic or rubber seal material which allows the circular disk 8 to rotate freely with respect to the circular disk 26. The circular disks or member 8 and 26 may be made of aluminum. Each of the balls 28*a* and 28*b* may be made of solid nylon and may have a one inch diameter. The arrangement shown in FIG. 3, may be designed in at least one embodiment to support four to five hundred pounds placed on top of circular member 8, so that circular member 8 can freely rotate with respect to the circular member 26 with the four to five hundred pounds pushing down in the direction D1 on the top surface 8*b*.

The circular disk 8 may have a diameter of D2, shown in FIG. 3, which may be approximately twelve inches. Each of the members 42 and 44, shown in FIG. 1A, may have a width W2, which may be about four inches. Each of the posts 52, 54, 56, and 58 may be a solid cylinder and may have a diameter D3 which may be about two inches, and a height H2 which may be about six inches as shown in FIG. 2A.

The circular disk 8, the circular disk 26, the member 4, the member 6, the member 24, the member 26, the top member 50, and the posts 52, 54, 56, and 58 may be made of aluminum.

Balls 28*a* and 28*b* are typically identical. Although only balls 28*a* and 28*b* are shown, typically there would be thirty to sixty balls, each identical to ball 28*a* or ball 28*b*, and each placed between walls 26*a* and 26*c*, and on the curved surface 26*b*, and would sit between the circular disk 8 and the circular disk 26.

The apparatus 1 can be used as a base for any product requiring a three hundred and sixty degree swivel action. The apparatus 1 has a top swivel assembly including brackets or clips 10 and 12 to accommodate existing bench and lawn chairs. The clips 10 and 12 shown will hold and locate the specific chair being used.

The apparatus 1 can be made in different sizes, and other changes can be done to accommodate weights and mounting requirements. The configuration shown in FIGS. 1A-3 (amount of parts) can be changed to reduce production costs and total assembly weight. The apparatus 1 can be made to be portable or stationary.

Typically, the apparatus 1 is portable with the chair or chairs being attached at a final location. In at least one embodiment, the apparatus 1 will be light in weight to allow easy transportation.

The apparatus 1 also allows cleaning of sand (from beach) or any similar type materials or debris to prevent swivel function from being disturbed.

Figure 4:
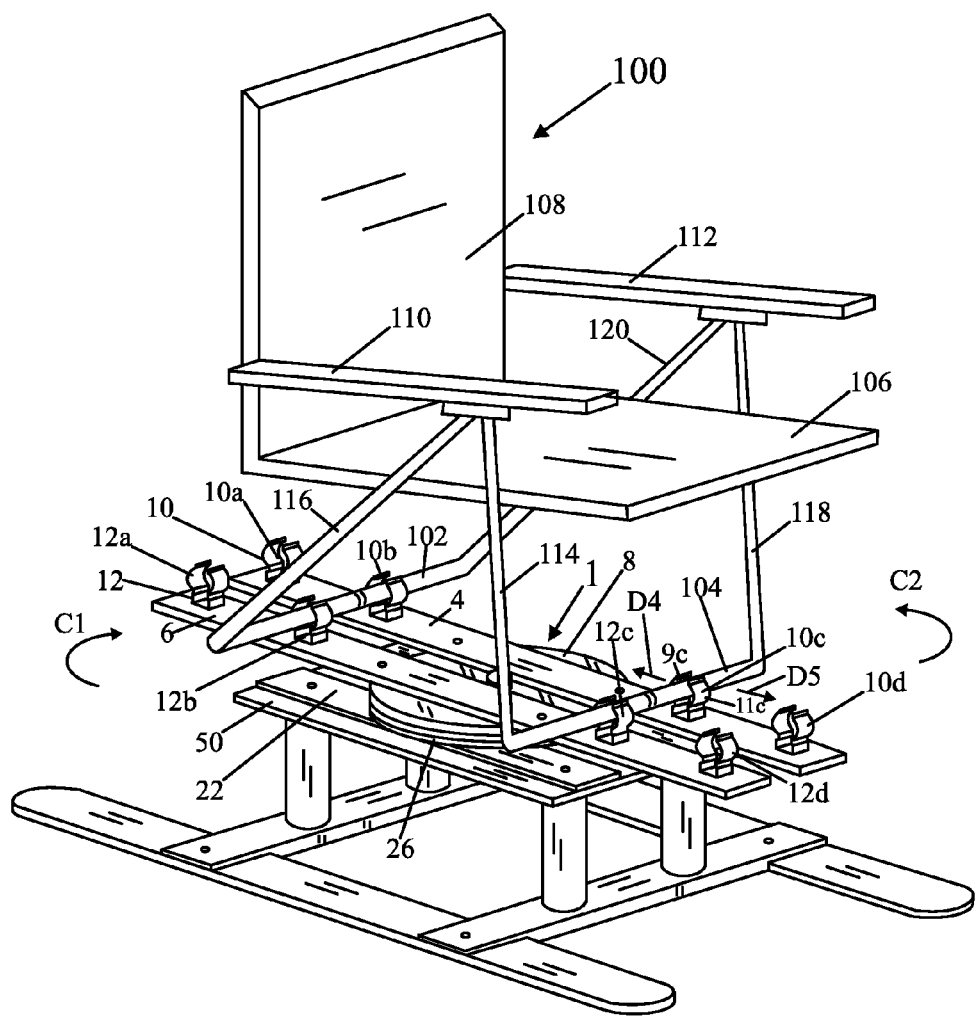
FIG. 4 shows a front, right side, top perspective view of the swivel apparatus of FIG. 1A in an assembled state with a chair attached to the swivel apparatus of FIG. 1A in accordance with an embodiment of the present invention.

FIG. 4 shows a front, right side, top perspective view of the swivel apparatus 1 of FIG. 1A in an assembled state with a chair 100 attached to the swivel apparatus 1 of FIG. 1A in accordance with an embodiment of the present invention.

The chair 100 includes a seat 106, a seat backing or back 108, arms 110, and 112, legs 114, 116, 118, and 120, and horizontal members 102 and 104. The chair 100 may be a folding chair as known in the art. The horizontal member 102 may be inserted into the clips 10*b* and 12*b* while at the same time the horizontal member 104 is inserted into the clips 10*c* and 12*c*. The horizontal members 102 and 104 push portions of the clips into which they are inserted apart and then are inserted into the clips. For example, member 104 pushes portion 9*c* in the direction D4 while at the same time pushing portion 11*c* in the direction D5 in order to pry the portions 9*c* and 11*c* of the clip 10*c* apart and allow the member 104 to be inserted into clip 10*c*. A space or gap between the portions 9*c* and 11*c* of the clip 10*c* may be smaller or more narrow than the diameter or width of the member 104 so that the member 104 is held in place by the clip 10*c* unless the portions 9*c* and 11*c* are again pried apart to loosen the member 104 from the clip 10*c*. The members 102 and 104 may be inserted into and held by any of the clips 10 or clips 12 in a similar or the same manner.

FIG. 4 shows the chair 100 inserted into and held by clips 10*b*, 12*b*, 11*c*, and 12*c*, but the apparatus 1 can accommodate other size chairs, such as chairs that would be held by clip 10*a*, 12*a*, and 10*d* and 12*d*, for example.

With the chair 100 attached to the apparatus 1, as shown in FIG. 4, the chair 100, along with the circular disk 8 to which the chair 100 is attached through members 4 and 6, can rotate in a clockwise direction C1 or in a counterclockwise direction C2 with respect to the circular disk 26 which is fixed to the table top 50 through members 22 and 24.

The apparatus 1 shown in FIGS. 1-4 can be modified in accordance with one or more embodiments of the present invention. In some embodiments, the number of parts can be reduced to reduce costs. In some embodiments, different materials may be used and/or different assembly methods. Sizes may be changed or reduced to reduce weights. Various parts may be combined together by molding methods. One or more parts may be replaced for assembly and for improved functional reasons. In one or more embodiments, the size and components used to accommodate products to be used with swivel assembly may be longer and heavier.

Figure 5:
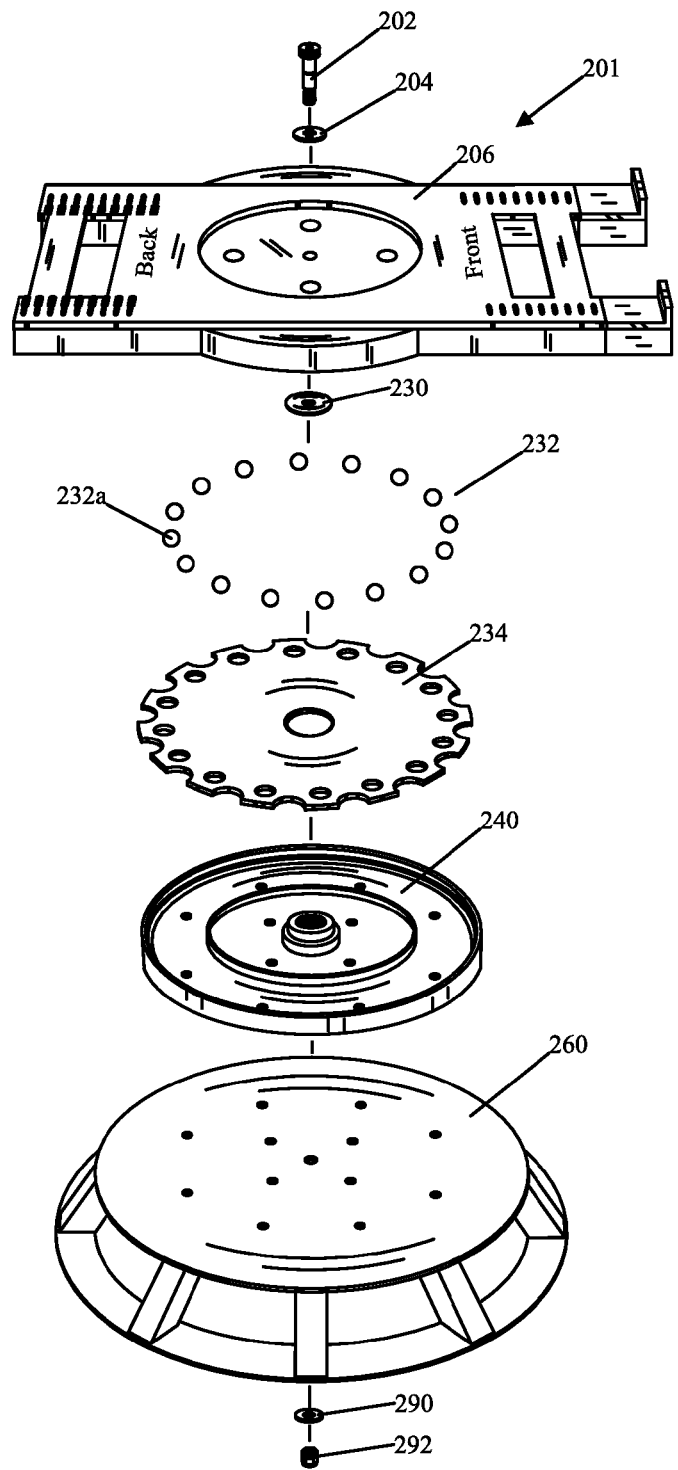
FIG. 5 shows a top, front, perspective view of an apparatus in accordance with an embodiment of the present invention, with the apparatus shown taken apart.

FIG. 5 shows a top, front, perspective view of an apparatus 201 in accordance with an embodiment of the present invention, with the apparatus 201 shown taken apart. The apparatus 201 includes a bolt 202, a first washer 204, a mounting device 206, a spacer 230, a plurality of balls 232, a first disc device 234, a second disc device 240, a base device 260, a second washer 290, and a nut 292. Although shown separately for descriptive purposes in FIG. 5, in at least one embodiment, the second disc device 240 generally is molded as part of the base device or base 260 in the configuration shown by FIG. 6. The providing of the second disc device 240 with the base device 260 as one integrated molded unit is preferred.

The mounting device 206 includes the designation and/or wording of "Back" and "Front" printed on or otherwise fixed to a top surface of the mounting device 206 as shown in FIG.

6. The "Back" and "Front" designation indicates where to put the back and front of a chair, respectively, such as chair 300 shown, in FIG. 10 respectively when placing and securing the chair 300 to the mounting device 206.

Figure 6:
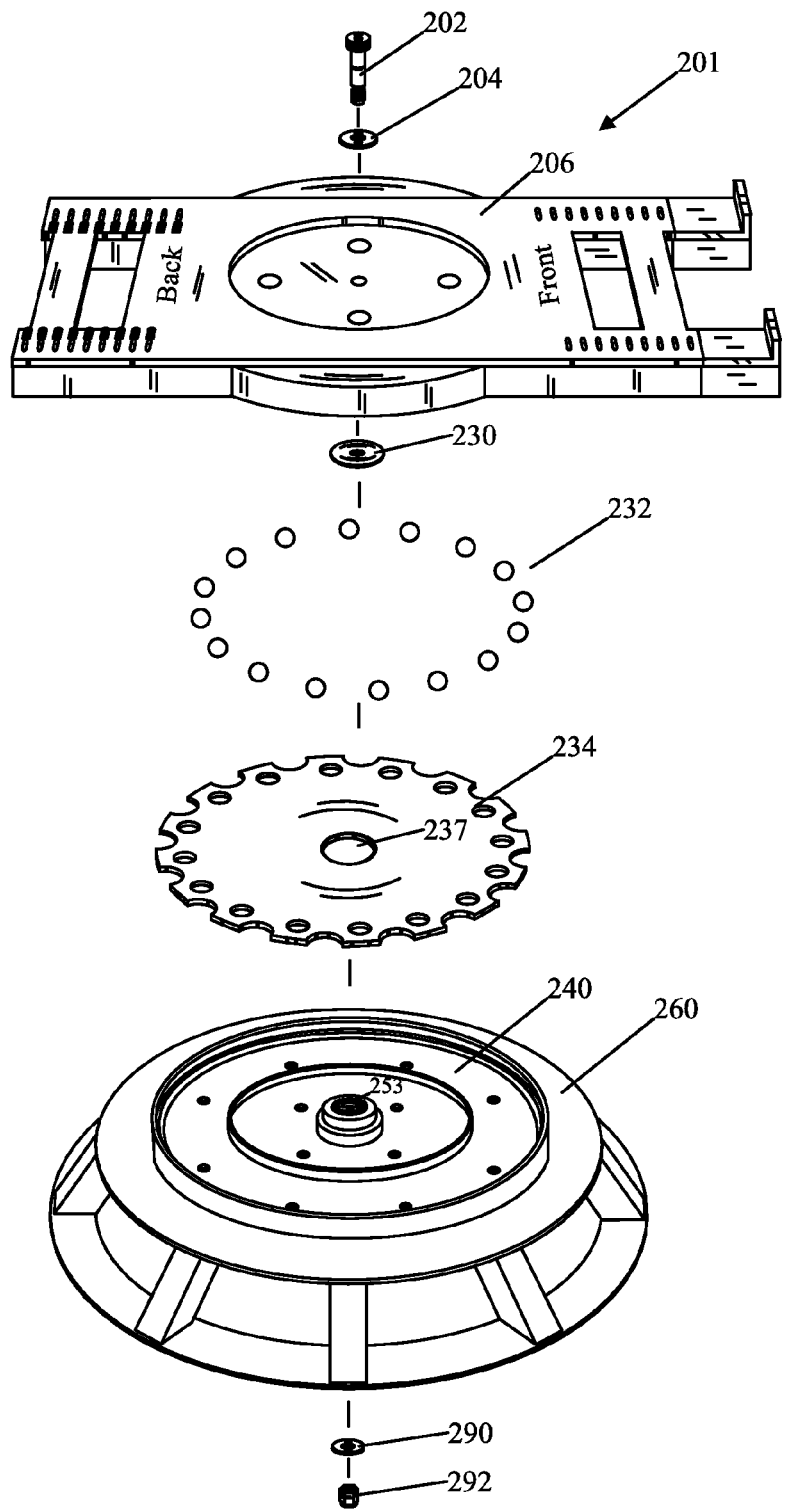
FIG. 6 shows a top, front, perspective view of the apparatus of FIG. 5 with the apparatus shown in a first partial state of assembly.

FIG. 6 shows a top, front, perspective view of the apparatus 201 with the apparatus 201 shown in a first partial state of assembly. In FIG. 6, the second disc device 240 has been centrally mounted to the base device 260, so that openings 258, 251a, 251b, 251c, 251d, 249a, 249b, 249c, 249d, 249e, 249f, 249g, and 249h (shown in FIG. 19A) are aligned with openings 266e, 266a, 266b, 266c, 266d, 264a, 264b, 264c, 264d, 264e, 264f, 264g, and 264h (shown in FIG. 20A), respectively. The second disc device 240 may be mounted by a strong adhesive to the base device 260, or the second disc device 240 may be molded and/or integrated with the base device 260. It is preferred, in at least one embodiment that the second disc device 240 and the base device 260 be molded as a one piece unit.

Figure 7:
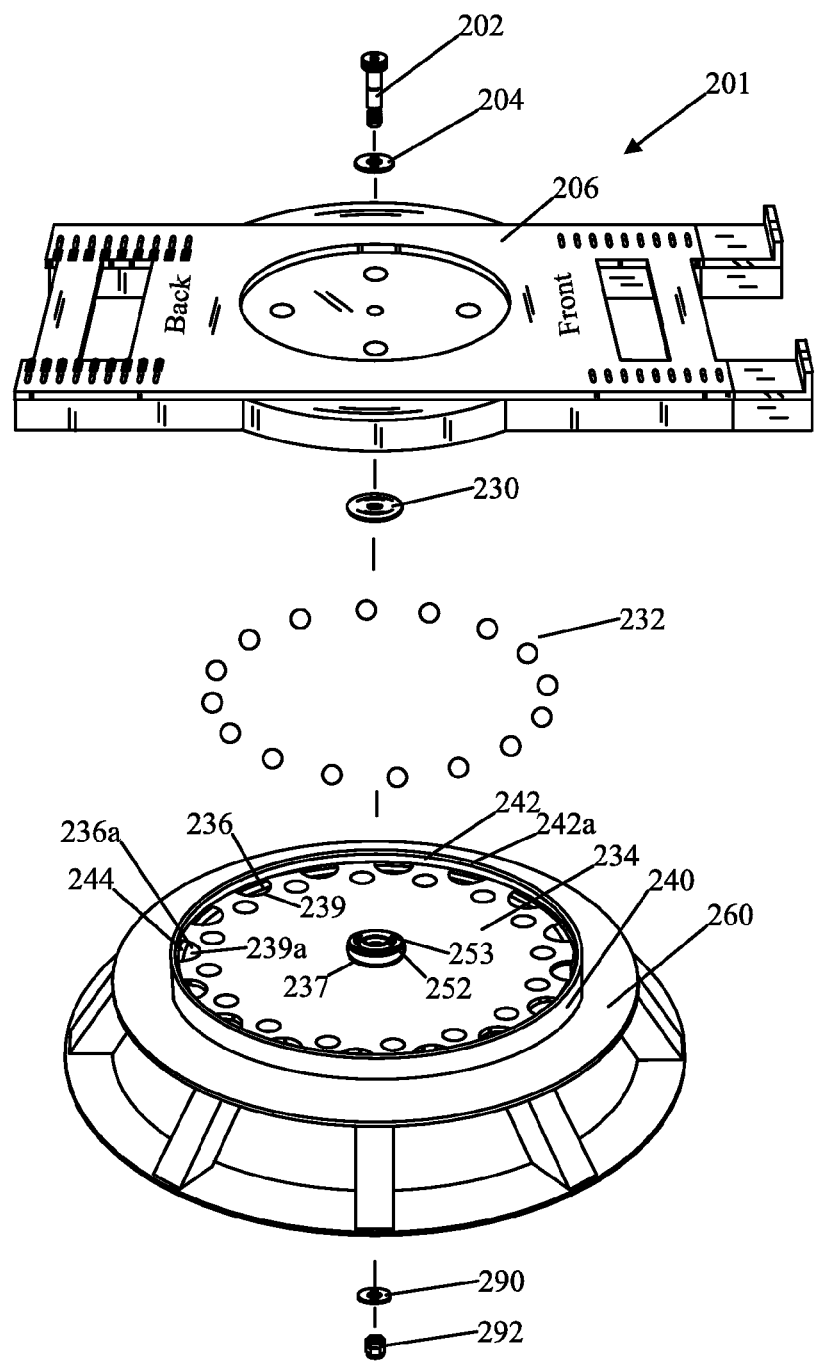
FIG. 7 shows a top, front, perspective view of the apparatus of FIG. 5 with the apparatus shown in a second partial state of assembly.
Figure 23A:
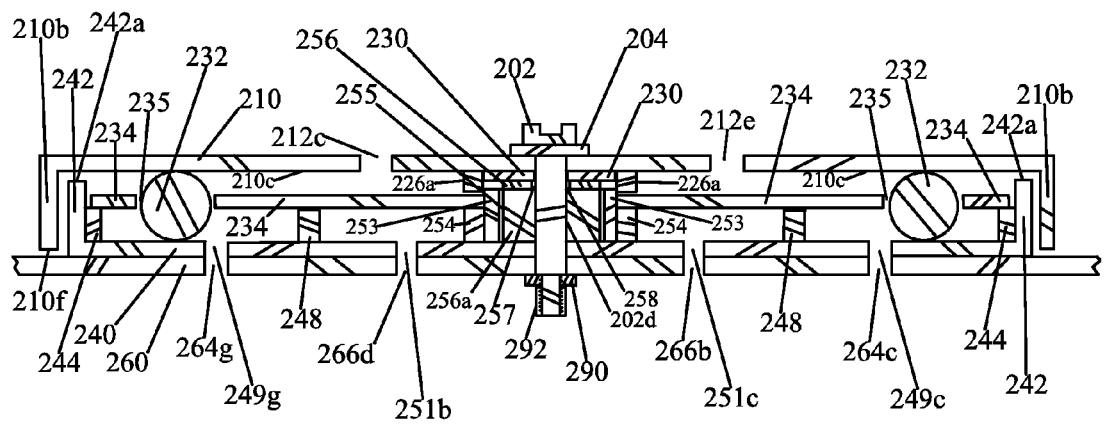
FIG. 23A shows a cross section of part of an assembled apparatus of FIG. 9, along a line passing through a center of the bolt of FIG. 11A in the center of the apparatus of FIG. 9, with the first disc device of FIG. 18A in an orientation such that a cross section of two bearing balls can be seen.
Figure 23B:
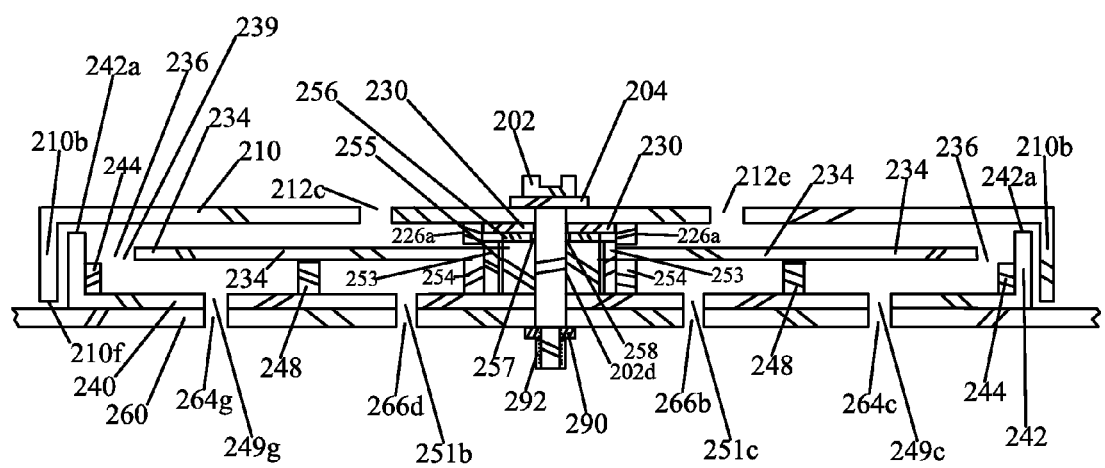
FIG. 23B shows a cross section of part of an assembled apparatus of FIG. 9, along a line passing through a center of the bolt of FIG. 11A in the center of the apparatus of FIG. 9, with the first disc device of FIG. 18A in an orientation such that a cross section of two bearing balls can be not be seen.

FIG. 7 shows a top, front, perspective view of the apparatus 201 with the apparatus 201 shown in a second partial state of assembly. In FIG. 7, the second disc device 240 has been mounted to and/or integrated with the base device 260 as in FIG. 6, and the first disc device 234 has been inserted into a chamber 240a within a peripheral wall 242 (shown in FIG. 19A) of the second disc device 240, so that the peripheral wall 242 of the second disc device 240 extends above the inserted first disc device 234, and device 253 of the second disc device 240 (shown in FIG. 19A) is inserted through a central opening 237 of the first disc device 234. In the configuration shown in FIG. 7, the first disc device 234 sits on an inner step or inner peripheral wall 244 within the peripheral wall 242 as shown by FIG. 23A, in a manner which forms a plurality of openings 239, as shown in FIG. 23B, including opening 239a, shown in FIG. 7. Each of the openings 239 is formed by part of one of the plurality of semicircular indentations 236 and the inner peripheral wall 244. For example, opening 239a is formed by an inner part of the indentation 236a and the inner peripheral wall 244. Each of the plurality of openings 239, including opening 239a allow water to pass through them, from above the first disc device 234 to below the first disc device 234 and then out of the swivel device or apparatus 201, through the openings 249a, 249b, 249c, 249d, 249e, 249f, 249g, and 249h (shown in FIG. 19A) and through the openings 264a, 264b, 264c, 264d, 264e, 264f, 264g, and 264h (shown in FIG. 20A).

Figure 8:
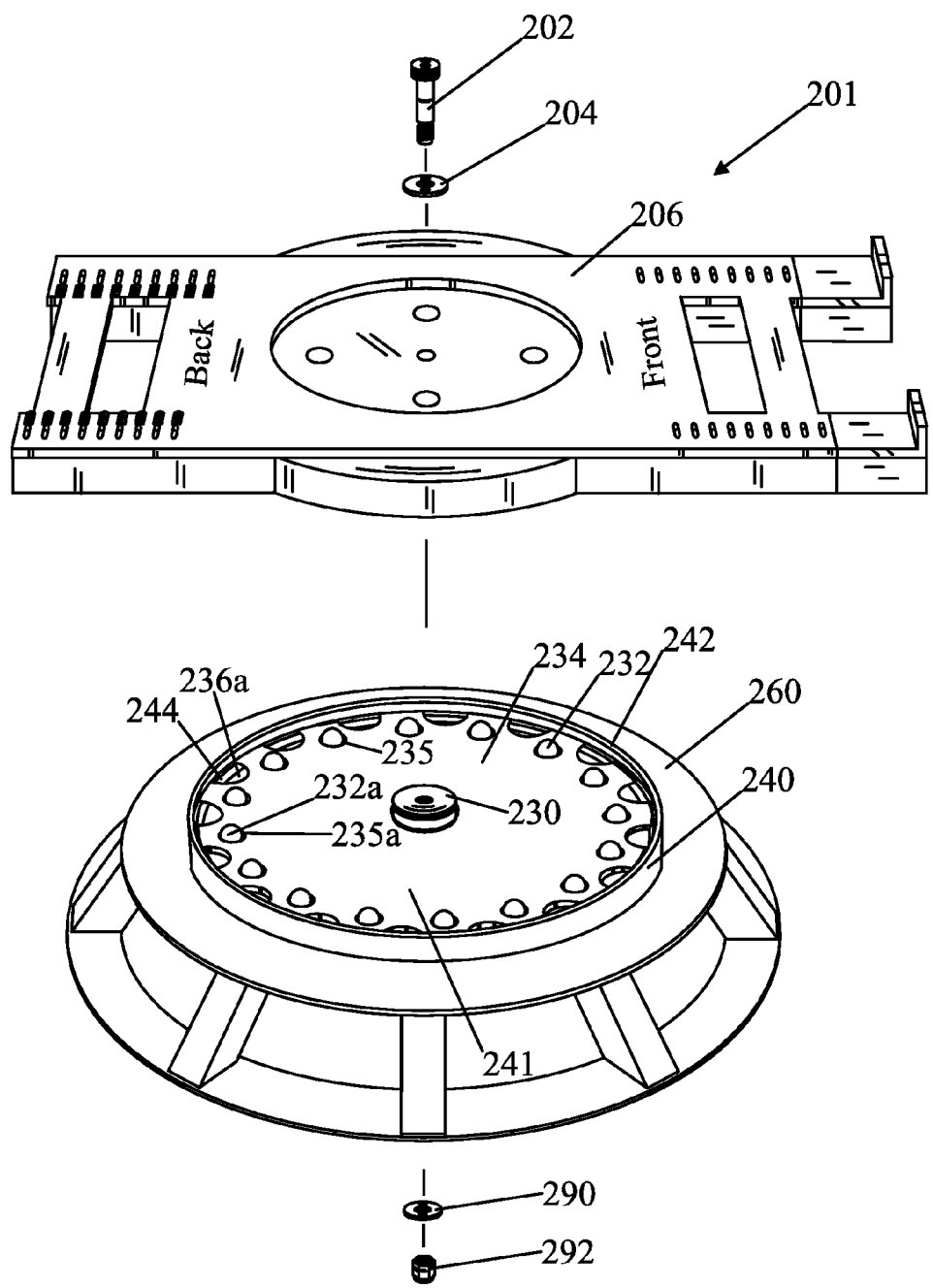
FIG. 8 shows a top, front, perspective view of the apparatus of FIG. 5 with the apparatus shown in a third partial state of assembly.

FIG. 8 shows a top, front, perspective view of the apparatus 201 with the apparatus 201 shown in a third partial state of assembly. In FIG. 8, each of the plurality of balls 232 have been inserted into an opening of the first disc device 234 so that about half of each of the plurality of balls 232 lies above the first disc device 234, and each of the plurality of balls 232 extends a distance above the outer peripheral wall 242 of the second disc device 240, as shown in FIG. 23A.

Figure 9:
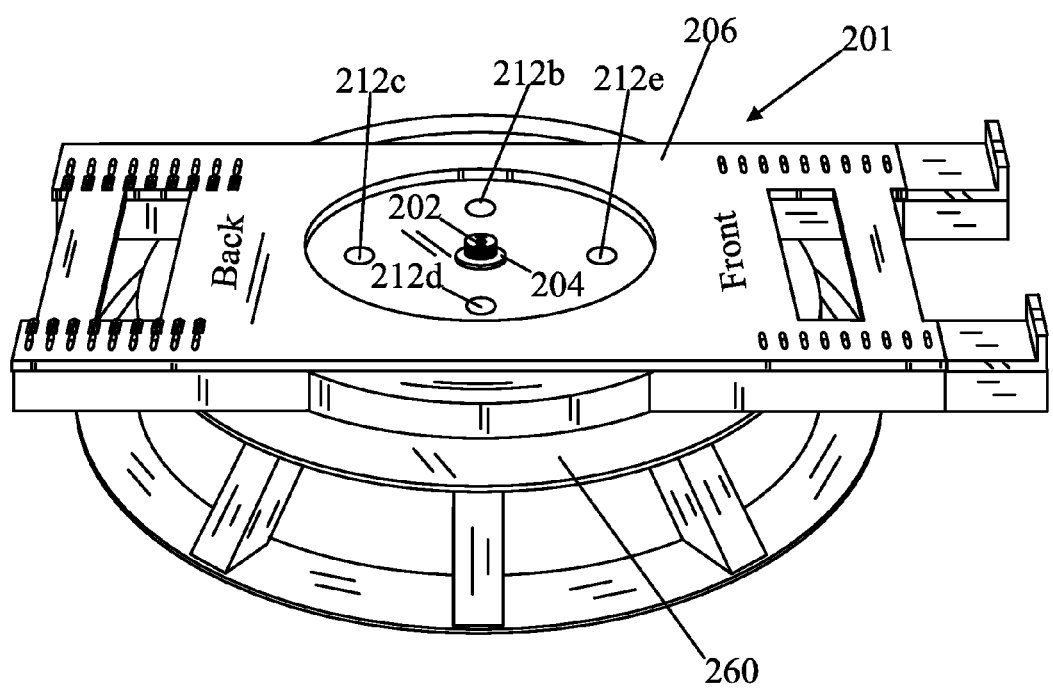
FIG. 9 shows a top, front, perspective view of the apparatus of FIG. 5 with the apparatus shown fully assembled.

FIG. 9 shows a top, front, perspective view of the apparatus or swivel device 201 with the apparatus 201 shown fully assembled. In FIG. 9, the mounting device 206 has been mounted on top of the base device 260. In the state of FIG. 9, an inner or bottom surface 210c (shown in FIG. 15A) of the mounting device 205 contacts and/or rests on the plurality of balls 232 and contacts and/or rest on the spacer 230, as shown by FIGS. 23A and 23B, but does not contact and/or rest on the outer peripheral wall 242. This allows the mounting device 206 to more easily rotate with respect to the base device 260, using the balls or bearing balls 232.

Figure 10:
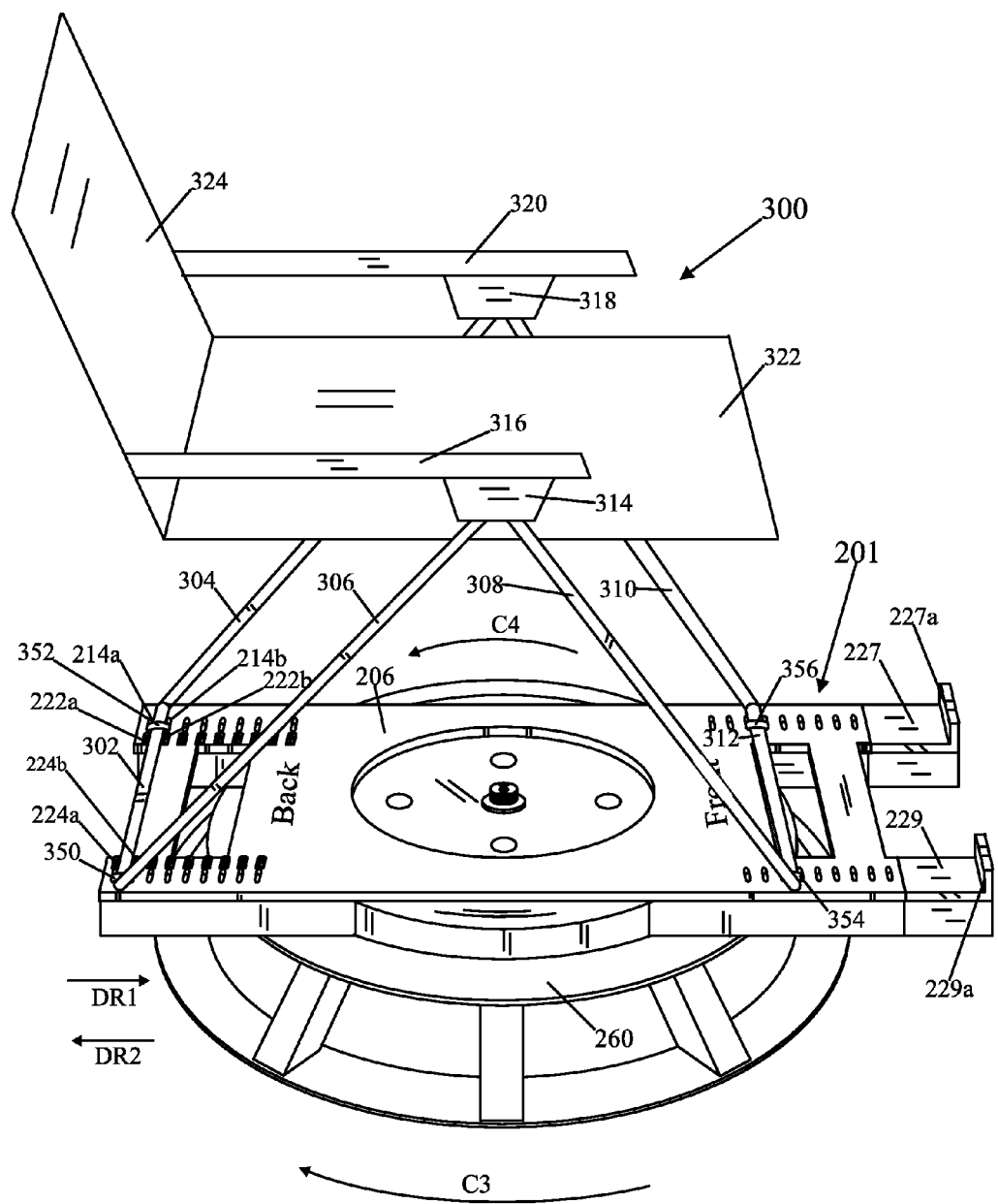
FIG. 10 shows a top, front, perspective view of the apparatus of FIG. 5 with the apparatus shown fully assembled and with a chair shown mounted to the apparatus of FIG. 5.

FIG. 10 shows a top, front, perspective view of the apparatus 201 with the apparatus 201 shown fully assembled and with a chair 300 shown secured and/or mounted to the apparatus or swivel device 201 of FIG. 5. The chair 300 includes a back leg member 306, a back leg member 304, a back leg member 302, a front leg member 308, a front leg member 310, and a front leg member 312. The leg members 304 and 306 may be fixed substantially at a ninety degree angle with respect to the leg member 302. The leg members 308 and 310 may be fixed substantially at a ninety degree angle with respect to the leg member 312. The members 302, 304, 306, 308, 310, and 312 may be made of a rigid metal or wood, or any other known material used for chair legs, and particularly for folding or collapsible chair legs. The chair 300 can be replaced by or may be any type of chair such as a lounge chair, or beach chair, or any other type of chair.

The leg members 304 and 306 may be fixed to devices 318 and 314, respectively, so that the leg members 304 and 306 can be locked in various orientations or at various angles with respect to devices 318 and 314. The devices 318 and 314 may be any type of known device for locking back and leg members into various orientations or allowing the leg members to be unlocked and set to other orientations with respect to the devices 318 and 314.

The chair 300 includes arms 316 and 320, seat 322 and back 324. The arms 316 and 320 are connected to the devices 314 and 318, respectively, and to the back 324. The seat is connected to the back 324, in a manner, in at least one embodiment, which allows the angle of the back 324 to change with respect to the seat 322.

In FIG. 10, the leg member 302 is inserted between the triangular prism members 222a and 222b at one end and triangular prism members 224a and 224b on another end, on the mounting device 206. In addition, the leg member 302 may be further secured to the mounting device 206 by a Velcro (trademarked) and/or hooks and loops strap 352 which may be inserted through slots 214a and 214b and held together by hooks and loops underneath the mounting device 206. Furthermore, the leg member 302 may be further secured to the mounting device 206 by a Velcro (trademarked) and/or hooks and loops strap 350 which may be inserted through slots 216a and 216b and held together by hooks and loop underneath the mounting device 206. Alternatively, the slots 214 and 216 may be eliminated, in at least one embodiment, since the triangular prism members 224 and 222 prevent sideways movement in the directions DR1 or DR2 shown in FIG. 10, and it may, for some purposes not be necessary to provide straps 350 and 352. Providing the triangular prism members 224 and 222 allow the mounting device 206 to prevent movement in directions DR1 and DR2 but allow the leg member 302 to be lifted off of the mounting device 206 so that it can be more easily removed, if Velcro (trademarked) straps 350 and 352 are not employed.

Figure 11A:
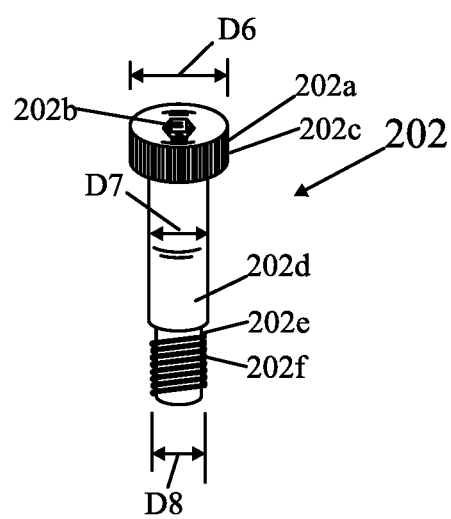
FIG. 11A shows a top, front perspective magnified view of a bolt of the apparatus of FIG. 9.
Figure 11B:
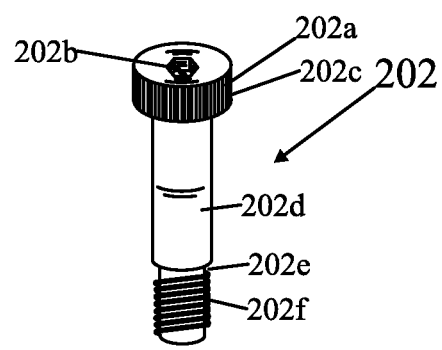
FIG. 11B shows a top, rear perspective magnified view of the bolt of FIG. 11A.

FIG. 11A shows a top, front perspective magnified view of the bolt 202 of the apparatus 201. FIG. 11B shows a top, rear perspective magnified view of the bolt 202. The bolt 202 includes a head or cap portion 202a which has ridges or finger grips 202c around its periphery. The head 202a has a cylindrical outer shape, and is solid except for a hex socket or hex shaped indentation 202b which is configured to receive a hex key, Allen key, or wrench of hexagonal cross section for tightening or loosening the bolt 202 with the nut 292 shown in FIG. 5. The head 202a may have an outer diameter of D6, which may be thirteen sixteenths of an inch, and which is sized to be larger than a diameter D9, of the first washer 204, shown in FIG. 12A. The bolt 202 may be made of a rigid metal such as steel. The bolt 202 includes a solid cylindrical body portion 202d, and a substantially cylindrical solid body portion 202e which has a plurality of outer threads 2022f. The body portion 202d has an outer diameter D7, which may be ten sixteenths or five eighths of an inch, and which is sized to be slightly smaller than the diameter D9 of the first washer 204, so that the body portions 2e and 2d can be inserted into an opening 4c of the first washer 204, and the body portion 202d snugly fits in the opening 204c. The outer threads 202f are helical shaped and may have an outer diameter of D8, which may be one half of an inch, and which is sized so that the outer threads 202f mesh with and/or can be screwed into inner threads 294c of the nut 292 shown in FIGS. 22A-22B.

Figure 12A:
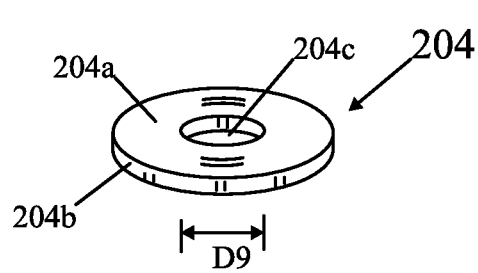
FIG. 12A shows a top, front perspective magnified view of a first washer of the apparatus of FIG. 5.
Figure 12B:
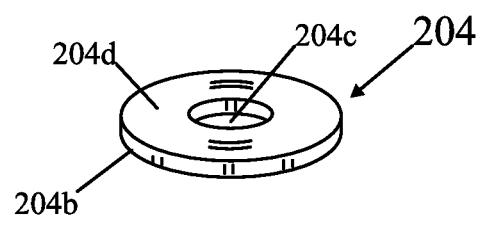
FIG. 12B shows a bottom, rear perspective magnified view of the first washer of FIG. 12A.

FIG. 12A shows a top, front perspective magnified view of the first washer 204. FIG. 12B shows a bottom, rear perspective magnified view of the first washer 204. The first washer 204 is a solid cylinder with the except of the opening 204c. The opening 204c is typically a circular bore having the diameter D4, which may be slightly larger than five eighths of an inch. The first washer 204 includes a top surface 204a, a periphery 204b, and a bottom surface 204d. The first washer 204 may be made of a solid rigid metal material such as steel.

Figure 13A:
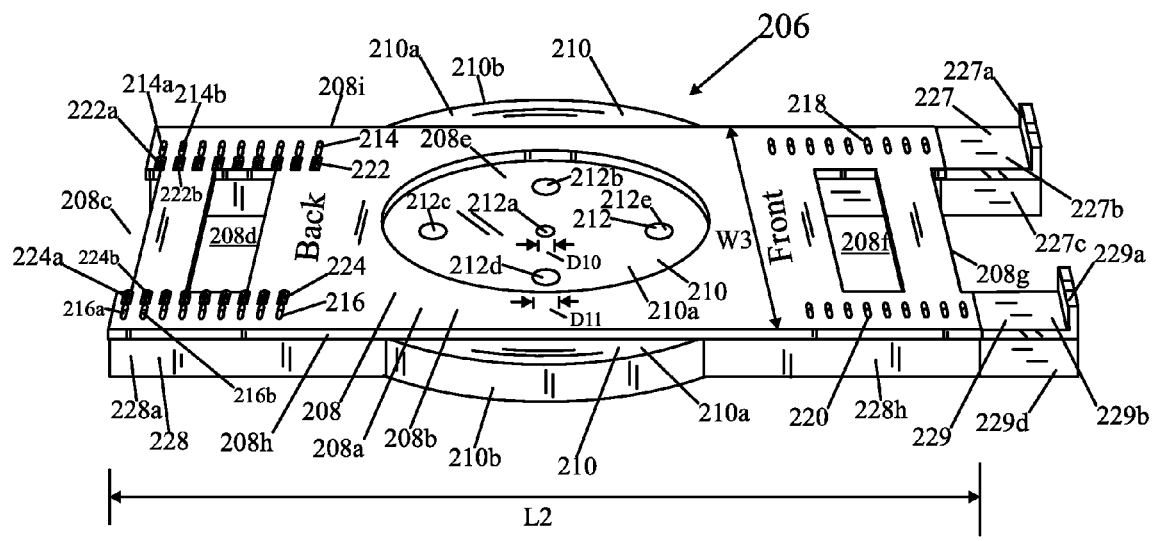
FIG. 13A shows a top, front perspective magnified view of a mounting device of the apparatus of FIG. 5.
Figure 13B:
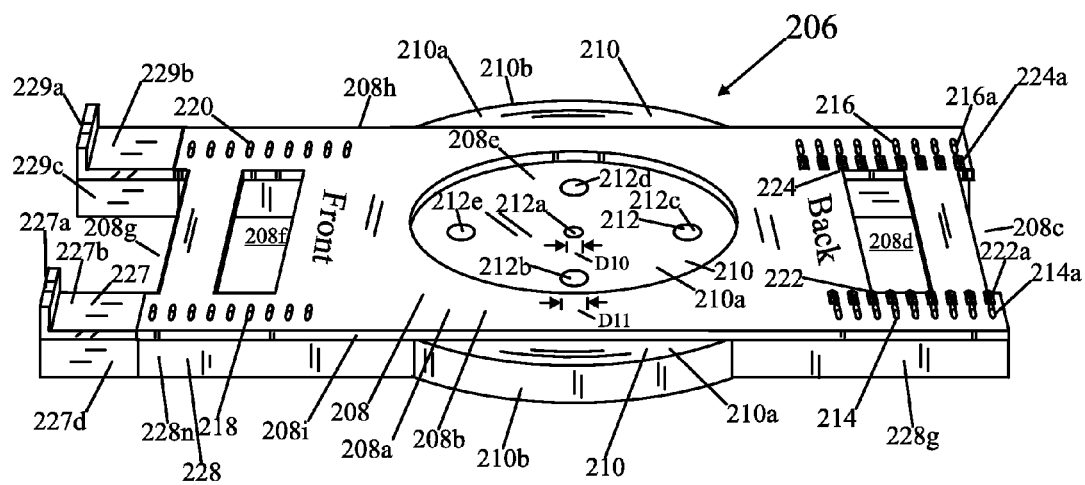
FIG. 13B shows a top, rear perspective magnified view of the mounting device of FIG. 13A.
Figure 15A:
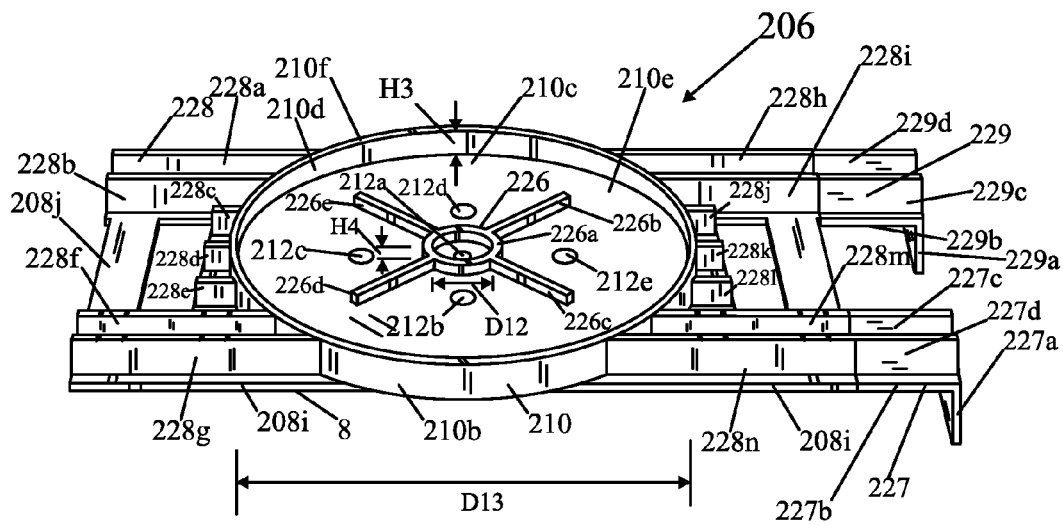
FIG. 15A shows a bottom, front perspective magnified view of the mounting device of FIG. 13A.
Figure 15B:
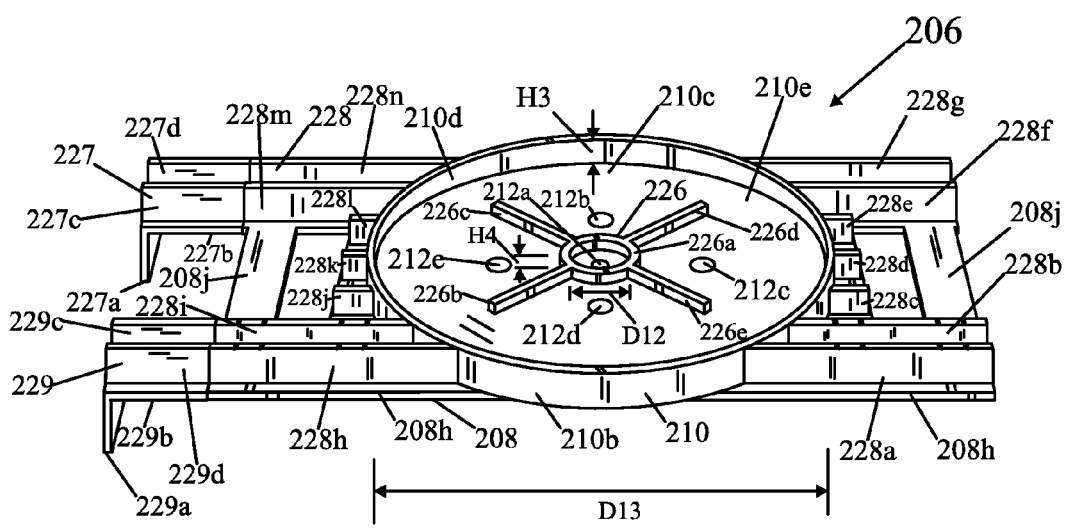
FIG. 15B shows a bottom, rear perspective magnified view of the mounting device of FIG. 13A.

FIG. 13A shows a top, front perspective magnified view of the mounting device 206. FIG. 13B shows a top, rear perspective magnified view of the mounting device 206. FIG. 13A shows a top, front perspective magnified view of two solid triangular prism structures 224a and 224b of the mounting device 2026. FIG. 13B shows a top, front perspective magnified view of the two solid triangular prism structures or members 224a and 224b, with member 302 of a chair 300 inserted in between the structures 224a and 224b. FIG. 15A shows a bottom, front perspective magnified view of the mounting device 206. FIG. 15B shows a bottom, rear perspective magnified view of the mounting device 206. In FIG. 14B, the member 306 is shown in dashed lines so that the strap 350 and connecting portions 350a and 350b can be seen.

Referring to FIGS. 13A, 13B, 15A, and 15B, the mounting device 206 includes top member or plate 208, disc member 210, a plurality of openings 212, first, second, third, and fourth sets of slots or openings 214, 216, 218, and 220, respectively, first and second sets of solid triangular prism structures 222 and 224, respectively, a device 226, shown in FIGS. 15A-15B, and a plurality of structural walls 228, shown in FIGS. 15A-15B.

The top member or plate 208 has a body portion 208a which has a top surface 208b, shown in FIG. 13A, and a bottom surface 208j, shown in FIG. 15A. The top member or plate 208 also has indentations 208c and 208g, and substantially rectangular openings 208d and 208f, shown in FIGS. 13A and 13B. The top member 208 has a front edge 208h and a rear edge 208i. The top member 208 is fixed to, molded with, and/or integrated with the disc member 210. The top member 208 and the disc member 210 may be made of hard, rigid plastic material.

The disc member 210 has a top surface 210a and a peripheral wall 210b shown in FIGS. 213A and 213B. The disc member 210 has a bottom surface 210c and an inner surface 210d of the peripheral wall 210b. The inner surface 210d has a height H3 shown in FIG. 15A, which is uniform and/or substantially uniform for the entire peripheral wall 210b. The disc member 210 includes a chamber or area 210e within the inner surface 210d of the peripheral wall 210b. The device 226 is inside the chamber 210e and is fixed to the surface 210c of the disc member 210. The device 226 may be made of a hard rigid plastic and may be fixed to, molded with, or otherwise integrated with the disc member 210. The device 226 includes a ring 226a, and protruding ribs 226b, 226c, 226d, and 226e. The ring 226a has an inner diameter of D7, which may be two and one half inches, and which may be sized to be slightly larger than an outer diameter D15 of a ring 253 for a device 252 referring to FIGS. 15A and 15C, and smaller than an outer diameter D16 of a ring 254 for the device 252, so that the ring 226a will circle the ring 253 (i.e. ring 253 will be within ring 226a) and sit on top of the ring 254 when the mounting device 206 is placed on top of the device 252, and spacer 230 as shown by FIG. 9.

The disc member 210 includes the plurality of openings 212. The plurality of openings 212 include a central opening 212a, and openings 212b, 212c, 212d, and 212e, which are arranged in north, south, east, and west directions from the central opening 212a. The central opening 212a may be circular and may have an inner diameter, D10 shown in FIG. 13A, which is slightly greater than the outer diameter D7, shown in FIG. 11A, of the body portion 202d of the bolt 202, which allows the body portion 202d to be inserted into the opening 212a and to snugly fit therein. The openings 212b-212e may be circular and may each have a diameter of D11, which may be about one inch, as shown in FIG. 13A.

Each of the first, second, third, and fourth sets of slots or openings 214, 216, 218, and 220, may be elongated in the direction of a width W3 of the mounting device 206, i.e. each slot may be substantially longer in the direction of the width W3 than in the direction of a length L2 shown in FIG. 13A. For example, each slot 214, 216, 218, and 220 may be one quarter inch in size in the direction of length L2, and one inch in size in the direction of the width W3. This elongated structure and arrangement is particularly suited for receiving a strap in one or more of the slots 214, 216, 218, and 220 to secure a leg of a chair to the mounting device 206. In at least one embodiment, a solid triangular prism structure of set 222 is provided for each of the slots 214, and a solid triangular prism structure of set 224 is provided for each of the slots 216. However, solid triangular prism structures, in at least one embodiment, are not provided for slots 218 and 220 to allow different sized chairs to be mounted more easily, i.e. the lengths of chairs, with length parallel to L2, do not have to be at certain fixed intervals (such as two feet, two feet and two inches, two feet and four inches) but rather the lengths of chairs can fit within broad parameters (such as any chair length between two feet and two feet four inches, for example).

The plurality or set of slots 214 includes slots 214a and 214b. The plurality or set of slots 216 includes slots 216a and 216b. The plurality or set of prism structures 222 includes structures 222a and 222b. The plurality or set of prism structures 224 includes structures 224a and 224b. The plurality of structural walls 228, includes walls 228a, 228b, 228c, 228d, 228e, 228f, 228g, 228g, 228i, 228j, 228k, 228l, 228m, and 228n. Each of walls 228a-228n is perpendicular or substantially perpendicular to the member 208. The peripheral wall 210b of the disc member 210 is also perpendicular or substantially perpendicular to the member 208. The ring 226a, and the members 226b-e are also perpendicular or substantially perpendicular to the member 208. The disc member 210 has an inner diameter D13, which may be eighteen inches, and which is sized to be slightly greater than an outer diameter D18 of the second disc device 240 shown in FIG. 19A, so that the disc member 210 can fit around the second disc device 240 providing a snug fit.

The ring 212a and the members 226b-e have a perpendicular height H4, with respect to the surface 210c of the member 210, which is less than the perpendicular height H3 of the inner surface 210d of the peripheral wall 210b. The height H3 may be fifteen sixteenths of an inch and the height H4 may be six sixteenths of an inch, in at least one embodiment. The dimensions, such as H3 and H4 are configured so that the bottom peripheral edge 210f, shown in FIG. 15A, of the disc member 210 will not contact a top surface 262a of the base 260 shown in FIG. 20A, when the mounting device 206 is arranged with respect to the base 260 as shown in FIG. 9. In FIG. 9, the inner surface 210c (shown in FIG. 15A) of the disc member 210 rests on the balls 232 (shown in FIG. 8), the bottom peripheral edge 210f does not contact the base 260, and a top peripheral edge 2242a (shown in FIG. 19A) of the second disc device 240 does not contact the inner surface 210c of the disc member 210. Thus when the disc member 210 rotates with respect to the base 260, the bottom peripheral edge 210f of member 210 (shown in FIG. 15A), and the top peripheral edge 242a of disc device 240 (shown in FIG. 19A) move freely. This configuration allows the disc member 210 and the mounting device 206 to rotate more freely with respect to the disc device 240 which is fixed to the base 260. Note also that the ring 226a (shown in FIG. 15A) does not contact the top surface 254a of the ring 254 or the first disc device 234, as shown by FIGS. 23A and 23B. Rather the ring 226A which encircles the ring 253, in the configuration of FIG. 5, is slightly above the first disc device 234 so that ring 226a and the first disc device 234 do not frictionally engage, in at least one embodiment.

Referring to FIG. 10 in operation the mounting device 206 can rotate in the clockwise direction C3 or in the counter-clockwise direction C4 with respect to the combination of the second disc device 240 and the base device 260.

The mounting device 206 may further include extension sections 227 and 229 shown in FIGS. 13A-13B, and 15A-15B. The extension sections 227 and 229 may be integral with the rest of the mounting device 206 and/or provided as a single molded unit with the rest of the mounting device 206. The extension section 227 may include a wall 227a and a floor 227b. The floor 227b may be perpendicular to the wall 227a. The extension section 227 may further include support walls 227c and 227d. Similarly, the extension section 229 may include a wall 229a and a floor 229b. The floor 229b may be perpendicular to the wall 229a. The extension section 229 may further include support walls 229c and 229d. The walls 227a and 229a, and the extensions 227 and 229 generally, may prevent a chair member such as chair member 312 shown in FIG. 10, from sliding in the direction DR1 beyond the walls 227a and 229a, as shown in FIG. 10. In one or more embodiments, extensions 227 and 229 may be particularly useful for lounge chairs, which may have a third leg device, i.e. in addition to a back leg device, including members 302, 304, and 306, a middle leg device, including members 308, 310, and 312, there may be a third leg device in front of the members 308, 310, and 312 which can be retained and/or prevented from sliding in the direction DR1 by walls 227a and 229a.

Figure 16A:
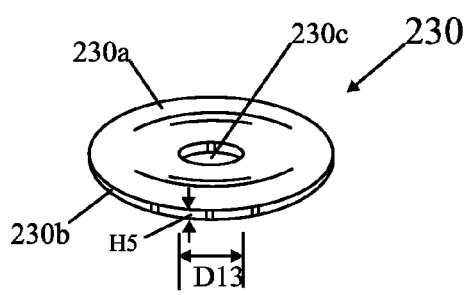
FIG. 16A shows a top, front perspective magnified view of a spacer of the apparatus of FIG. 5.
Figure 16B:
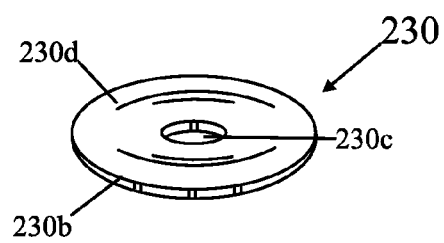
FIG. 16B shows a bottom, rear perspective magnified view of the spacer of FIG. 16A.

FIG. 16A shows a top, front perspective magnified view of the spacer 230 of the apparatus 201. FIG. 16B shows a bottom, rear perspective magnified view of the spacer 230. The spacer 230 may be a cylinder with the exception of a circular opening or bore 230c. The spacer 230 includes top surface 230a, periphery 230b, and bottom surface 230d. The circular opening 230c may have a diameter of D8, which may be the same as the inner diameter D5 of the opening 212a of the disc member 210 of FIG. 13A. The opening 230c is configured to allow passage of the body portion 202d of the bolt 202 of FIG. 11A, and thus D8 is typically slightly greater than the diameter D2 of the body portion 202d of the bolt 202. The spacer 230 may be made of hard plastic. The periphery 230b of the spacer may have a uniform height H5 which may be one eighth of an inch. The spacer 230 may be used to place on top of the bearing 256 and inner ring 257 of the device 252 shown in FIGS. 19B and 19C to provide a smoother contact surface for the inner surface 210c of the disc member 210 inside of the ring 212a. In addition, the spacer 230 may rotate freely, with the bearing 256 and inner ring 257 with respect to the rings 255 and 253 which remain stationary with respect to the surface 240a of the second disc device 240, while the body portion 202d of the bolt 202 is through the opening 230c, which may allow easier rotation of the mounting device 206 with respect to the second disc device 240 and the base 260. Alternatively, apparatus 201 may be configured so that the inner surface 210c may made no contact with the spacer 230.

Figure 17A:
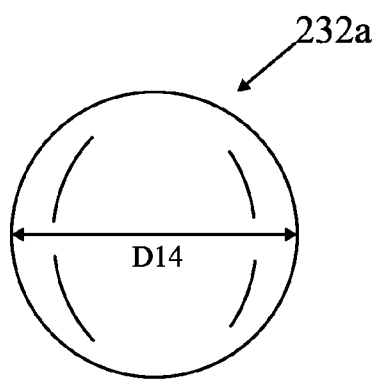
FIG. 17A shows a front view of a ball of the apparatus of FIG. 5.
Figure 17B:
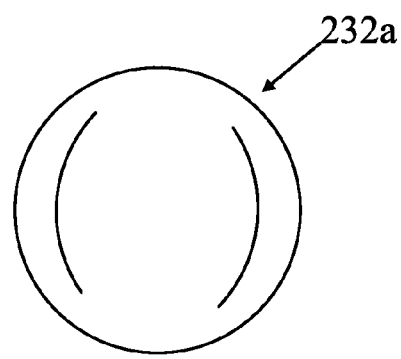
FIG. 17B shows a rear view of the ball of FIG. 13A.

FIG. 17A shows a front view of a ball 232a of the apparatus 201. FIG. 17B shows a rear view of the ball 232a. The ball 232a may be a solid hard plastic ball or sphere. The ball 232a may have a diameter of D14, which may be fifteen sixteenths of an inch, which is configured to be slightly smaller than the diameter D16 of each opening of the plurality of openings 235 of the first disc device 234 shown in FIGS. 18A-18B. For example, opening 235a of the openings 235 has a diameter of D16, shown in FIG. 18A, which may be one inch, and allows the ball 232a to be inserted therein.

Figure 18A:
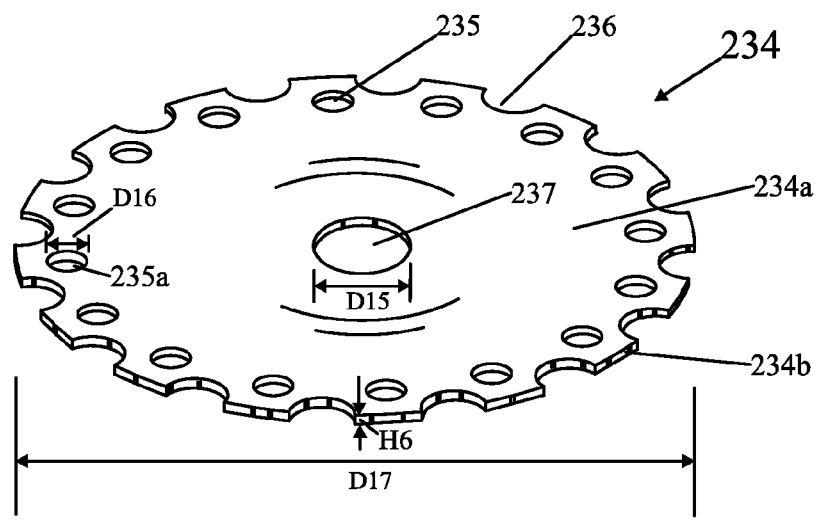
FIG. 18A shows a top, front perspective view of a first disc device of the apparatus of FIG. 5.
Figure 18B:
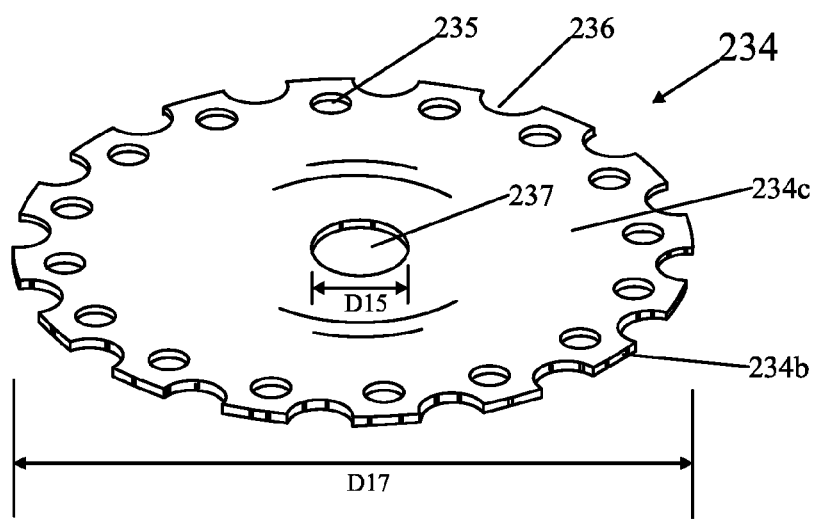
FIG. 18B shows a rear, bottom perspective view of the first disc device of FIG. 18A.

FIG. 18A shows a top, front perspective view of a first disc device 234 of the apparatus 201. FIG. 18B shows a rear, bottom perspective view of the first disc device 234. The first disc device 234 includes a top surface 234a, a peripheral edge 234b, and a bottom surface 234c. The first disc device 234 has a plurality of circular openings 235, including opening 235a. The first disc device 234 also has a central opening 237, which may have an inner diameter of D15 which may be slightly larger than the outer diameter D20 of the ring 253 of device 252 and smaller than the outer diameter, D21, of the ring 254 of the device 252 shown in FIG. 19C so that the first disc device 234 sits on the ring 254 with the central opening 237 encircling the ring 253 in the states of FIGS. 7 and 8. In addition, in the states of FIG. 7 and FIG. 8, the first disc device 234 lies below the peripheral edge 242a of the peripheral wall 242 of the second disc device 240. The first disc device 234 may have an outer diameter of D17, which is smaller than the inner diameter, D18, which may be about seventeen and one half inches, shown in FIG. 19A of the second disc device 240 so that that the device 234 can fit within the device 240 as shown in FIGS. 7 and 8. The first disc device 234 may include a plurality of indentations 236, which may be semicircular shaped. The peripheral edge 234b of the first disc device 234 may have a uniform height H6 shown in FIG. 18A, which may be less than the difference in heights H7 and H8, shown in FIG. 19A, of the second disc device 240. The first disc device 234 sits on a step or ring 244 of the second disc device 240 in the states of FIGS. 7 and 8, and does not extend above the edge 242a.

Figure 19A:
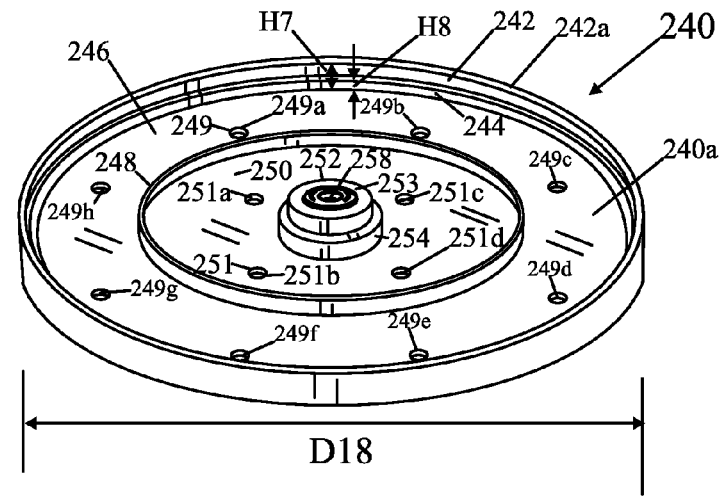
FIG. 19A shows a top, front perspective view of a second disc device of the apparatus of FIG. 5.
Figure 19B:
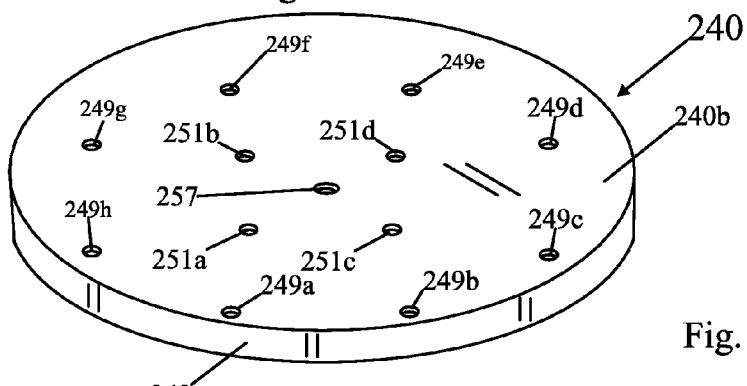
FIG. 19B shows a rear, bottom perspective view of the second disc device of FIG. 19A.
Figure 19C:
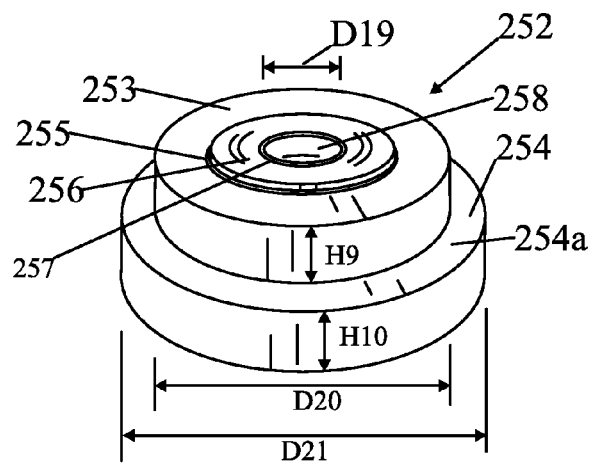
FIG. 19C shows a top, front perspective view of a part of the second disc device of the apparatus of FIG. 5.

FIG. 19A shows a top, front perspective magnified view of the second disc device 240 of the apparatus 201. FIG. 19B shows a rear, bottom perspective magnified view of the second disc device 240. The second disc device 240 the peripheral wall 242, and interior wall or step 244, a channel 246, an inner wall 248, a channel 250, and a device 252. The peripheral wall 242 has a uniform interior height, H7, which may be fourteen sixteenths inches. The interior wall or step 244 has a uniform height H8, which may be one half inch. The channel 246 has a plurality of openings 249 which include openings 249a, 249b, 249c, 249d, 249e, 249f, 249g, and 249h, each of which may have a diameter of one half inch. The channel 250 has a plurality of openings 251 which include openings 251a, 251b, 251c, and 251d, each of which may have a diameter of one half inch. Referring to FIG. 19C, the device 252 may include the ring 253, the ring 254, a metal ring 255, a bushing ring 256, and a rotating metal ring or component 257. The ring 257 easily rotates within the bushing ring 256 and the ring 255 remain stationary. The rings 255 and 256 are fixed with respect to the rings 253 and 254. The rings 253 and 254 are fixed centrally with respect to the channel 250 and with respect to the second disc device 240. The ring 257 has an opening 258 with an inner diameter D19, which may be slightly larger than the diameter D7 of the body portion 202*d* of the bolt 202, shown in FIG. 11A, of the bolt 202, so that the body portion 202*d* snugly fits within the opening 258. The ring 253 has a uniform peripheral height of H9, which may be seven sixteenths of an inch, and the ring 254 has a uniform peripheral height of H10, which may be seven sixteenths of an inch. Thus the ball 232*a* diameter D14, which in one embodiment is fifteen sixteenths of an inch, is greater than the combination of the heights H9 and H10 of the rings 253 and 254 (fourteen sixteenths of an inch), and greater than the inner height H7 of the peripheral wall 242, which is fourteen sixteenths of an inch, of the second disc device 240, which results in the inner surface 210*c* of the disc member 210 of the mounting device 206 resting on the balls 232 an not on the edge 242*a* (shown in FIG. 19A) of the peripheral wall 242.

Figure 20A:
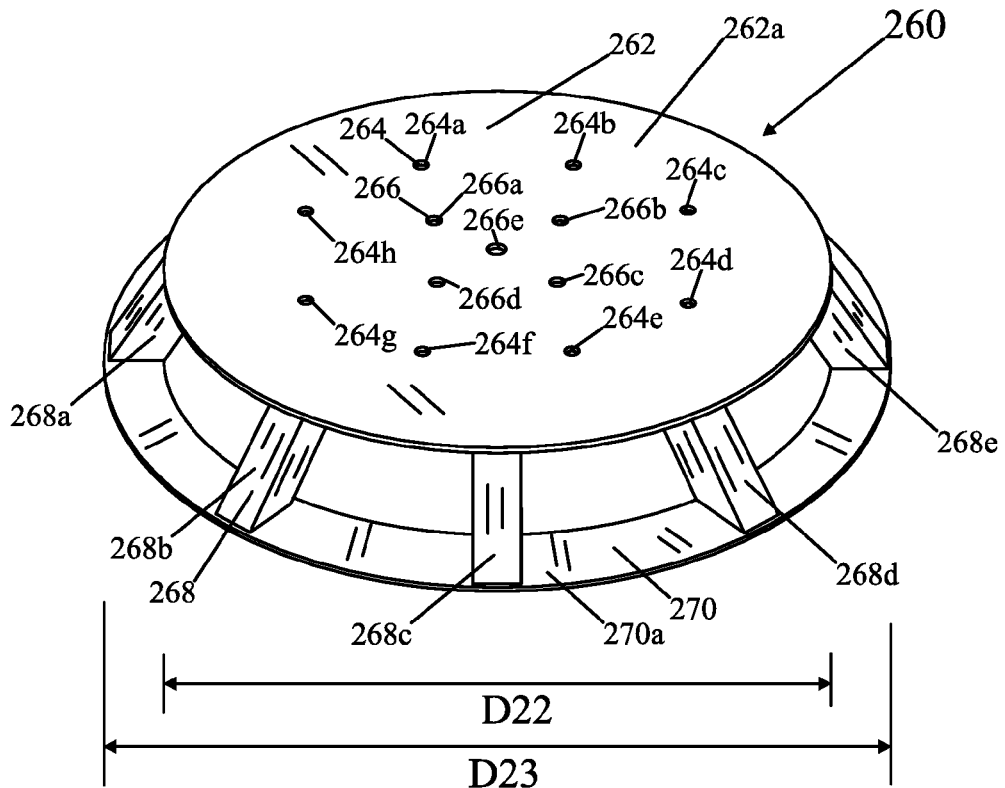
FIG. 20A shows a top, front perspective view of a base device of the apparatus of FIG. 5.
Figure 20B:
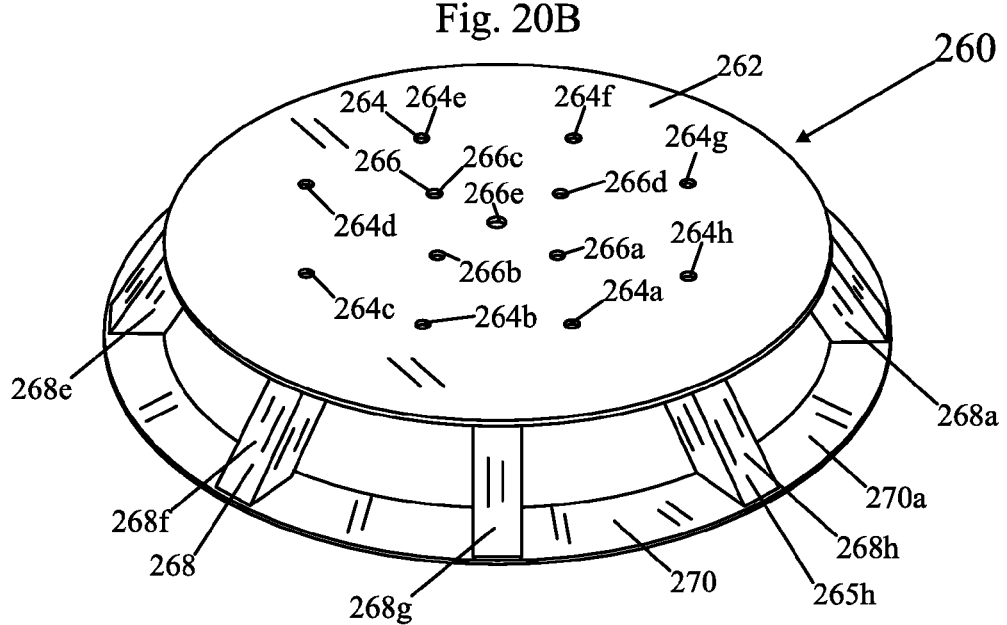
FIG. 20B shows a rear, front perspective view of the base device of FIG. 20A.
Figure 20C:
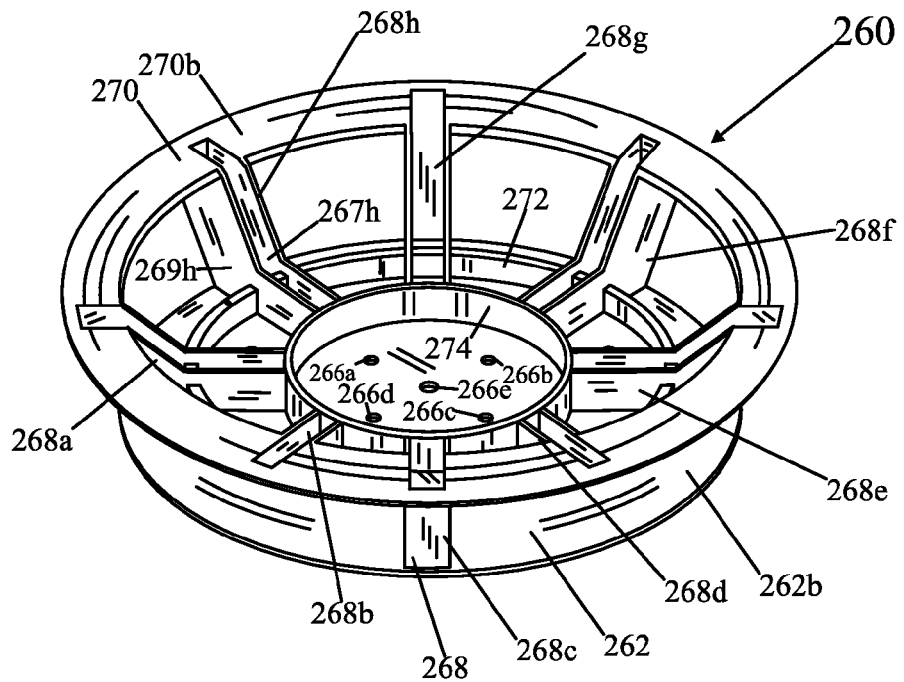
FIG. 20C shows a bottom, front perspective view of the base device of FIG. 20A.
Figure 20D:
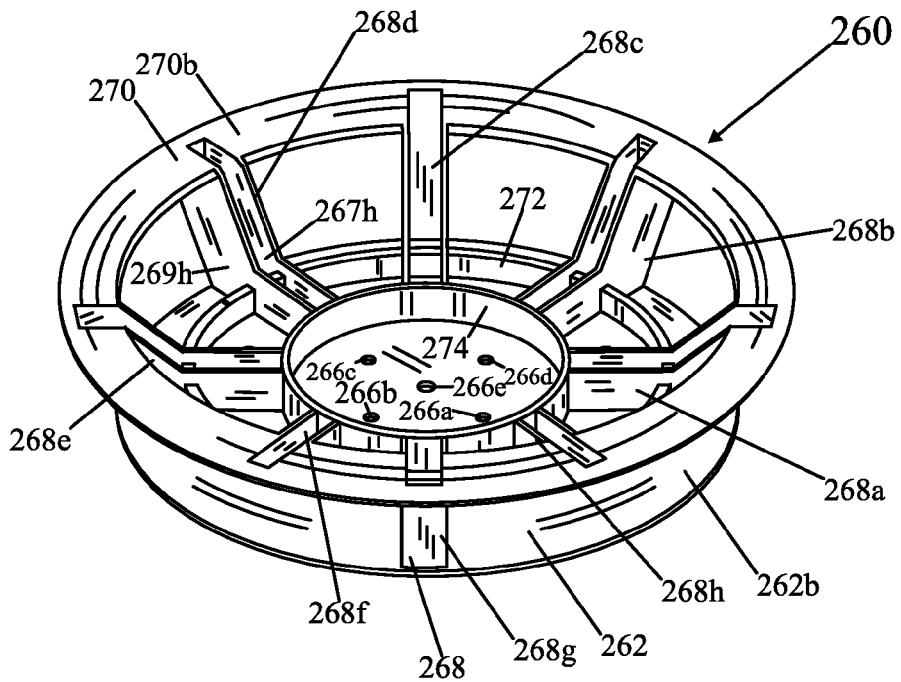
FIG. 20D shows a bottom, rear perspective view of the base device of FIG. 20A.

FIG. 20A shows a top, front perspective view of a base device 260 of the apparatus 1. FIG. 20B shows a rear, front perspective view of the base device 260. FIG. 20C shows a bottom, front perspective view of the base device 260. FIG. 20D shows a bottom, rear perspective view of the base device 260. The base device 260 includes a top disc member 262, a plurality of openings 264, a plurality of openings 266, a plurality of support devices 268, a bottom disc member 270, a first inner support ring 272, and a second inner support ring 274.

The top disc member 262 may be made of a hard rigid plastic. The plurality of openings 264 include openings 264*a*, 264*b*, 264*c*, 264*d*, 264*e*, 264*f*, 264*g*, and 264*h*, each of which may have a diameter of one half inch. The plurality of openings 266 include openings 266*a*, 266*b*, 266*c*, 266*d*, and 266*e*. The openings 266*a-d* may have a diameter of one half inch. The opening 266*e* is a central opening which may have a diameter slightly larger than the body portion 202*d* of the bolt 202 to allow passage of the body portion 202*d* through the opening 266*e* and to provide a snug fit.

The plurality of support devices 268 may include support devices 268*a*, 268*b*, 268*c*, 268*d*, 268*e*, 268*f*, 268*g*, and 268*h*. Support device 268*h* will be described in greater detail, however, each of support devices 268 may be identical or substantially the same. Support device 268*h* may include side supports 267*h* and 269*h* (shown in FIG. 20C) and front support 265*h* (shown in FIG. 20B). The side supports 267*h* and 269*h* may be fixed perpendicular or substantially perpendicular to the top disc member 262 and to the bottom disc member 270 which are parallel or substantially parallel to each other. The first inner support ring 272 and the second inner support ring 274 may also be fixed perpendicular or substantially perpendicular to the disc member 262. The entire base 260 may made from hard rigid plastic and may be made from a mold. The support devices 268 are integrated with and/or fixed to members 270, 262, and rings 272 and 274 as shown in FIGS. 20C and 16D to provide strong structural support. Each of support devices 268 may have an open channel between adjacent walls, such as between walls 268*h* and 267*h* for support device 268*h*, to allow the base device 260 and also, in at least one embodiment in combination with or integrally with second disc device 240, to be ejected from a mold.

FIG. 21A shows a top, front perspective view of a second washer 290 of the apparatus or swivel device 201. FIG. 21B shows a rear, bottom perspective view of the second washer 290. The second washer 290 may be a solid cylinder with the exception of an opening 290*c*. The second washer 290 includes a top surface 290*a*, a periphery 290*b*, and a bottom surface 290*d*. The opening 290*c* has a inner diameter D19 which is typically smaller than the diameter D7 of the body portion 202*d* of the bolt 202 of FIG. 11A, so that the washer 290 cannot fit on the body portion 2*d*. However, the diameter D19 is typically slightly larger than the portion 202*e* having outer threads 202*f*, so that the portion 202*e* and outer threads 202*f* can fit through the opening 290*c*. The second washer 290 has an outer diameter D20 which is larger than the opening 266*e* shown in FIG. 20C of the base 260.

FIG. 22A shows a top, front perspective view of a nut 292 of the apparatus 201. FIG. 22B shows a top, rear perspective view of the nut 292. The nut 292 includes a top portion 294 and a bottom portion 296. The top portion 294 includes an opening 294*a* leading to a chamber 294*b* which have interior threads 294*c* which mesh and/or connect with exterior threads 202*f* of the bolt 202 of FIG. 11A. The top portion 294 has a hexagonal outer surface 294*d*. The bottom portion 296 has a cylindrical outer surface. The chamber 294*b* has an inner diameter of D21 for placing the nut 292 onto the threads 202*f* of the bolt 202 of FIG. 11A. The nut 292 may be a lock nut.

In operation, to clean the apparatus or swivel device 201 shown in FIG. 9 of sand, dirt or other debris, a hose supplies water into one or more of openings 212*c*, 212*b*, 212*d*, and 212*e*. Water flowing into any one of openings 212*c*-212*e*, flows into a cavity 241, shown in FIG. 8, which when the apparatus or swivel device 201 is in its assembled state of FIG. 9, lies between the inner surface 210*c*, shown in FIG. 15A, of mounting device 206 and the top surface 234*a*, shown in FIG. 18A, of the first disc device 234. The water thereafter flows from the cavity 241 through the openings formed by inner wall 244 and indentations 236, such as indentation 236*a* shown in FIG. 208, into a cavity or channel 246 shown in FIG. 19A of the second disc device 240. The water then flows out of cavity or channel 246, through openings 49*a*-49*h*, shown in FIG. 19A, through aligned openings 64*a*-64*h* shown in FIG. 20A and thus out of swivel device or apparatus 1. Water may also pass from cavity 241 to cavity or channel 246 through spaces between balls 232 and openings 235. The passage of water through the swivel device or apparatus 201 can be used to clean sand, dirt or other debris out of the apparatus 201 and to keep the swivel device or apparatus 201 functioning properly, particularly so that the plurality of balls 232 keep rotating smoothly to allow the smooth rotation of mounting device 206 with respect to base device 260.

Sixteen balls or bearing balls may be provided for the plurality of balls 32.

FIG. 23A shows a cross section of part of an assembled apparatus or swivel device 201 of FIG. 9, along a line passing through a center of the bolt 202 of FIG. 11A in the center of the apparatus 201 of FIG. 9, with the first disc device 234 of FIG. 18A in an orientation such that a cross section of two bearing balls 232 can be seen. FIG. 23B shows a cross section of part of an assembled apparatus 201 of FIG. 9, along a line passing through a center of the bolt 202 of FIG. 11A in the center of the apparatus 201 of FIG. 9, with the first disc device 234 of FIG. 18A in an orientation such that a cross section of two bearing balls 232 can be not be seen.

Referring to FIG. 23A, the inner surface or bottom surface 210*c* of the disc member 210 of the mounting device 206 is shown resting simultaneously on a ball of plurality of balls 232 on the left and a ball of plurality of balls 232 on the right of FIG. 23A. In at least one embodiment the inner surface 210*c* rests and/or is supported by all of the plurality of balls 232 at the same time, such as by sixteen balls 232 shown in FIG. 5, at the same time. At the same time, the balls 232 sit on the second disc device 240. The inner surface 210*c* of the disc member 210 also, simultaneously, rests on spacer 230. The spacer 230 rests on bearing 256 and inner ring 257. Bearing 256 and/or ring 257 rotate with respect to ring 255. Ring 255 is fixed with respect to ring 253 which is fixed to ring 254, which is fixed to second disc device 240. Bearing 256 rotates on top of or within ring 256*a*. Rings 254, 253, 255, and 256*a* are fixed to the second disc device 240. Thus, in at least one embodiment, the inner surface 210c only rests simultaneously on balls 232 and on spacer 230 while the mounting device 206 rotates with respect to the base device 260 (and second disc device 240, which is typically molded together as one piece with base device 260), which results in smooth rotation of mounting device 206 with respect to the combination of second disc device 240 and base device 260.

In FIG. 23A, the first disc device 234 rests on the inner peripheral or circular wall 244 and within the outer wall peripheral or circular wall 242, and the first disc device 234 simultaneously rests on the inner circular wall 248 and on the ring 254. The first disc device 234 can be rotated with respect to the second disc device 240 which may be integrated with the base device 260, and with respect to the mounting device 206. Each of the balls 232 lies in an opening of the plurality of openings 235 of the first disc device 234.

The peripheral wall 210b of the disc member 210 of the mounting device 206, in at least one embodiment, does not contact the wall 242, and the inner surface 210c does not contact the edge 242a of the wall 242, but rather only contacts the balls 232 and the spacer 230 during rotation, also resulting in smooth rotation of mounting device 206 with respect to the combination of second disc device 240 and base device 260.

In FIG. 23B, the first disc device 234 has been rotated with respect to the disc member 210 of the mounting device 206 and with respect to the second disc device 240 and the base device 260, so that the indentations 236 in the first disc device 234 can be seen. In at least one embodiment, water can be supplied into openings 212 of the mounting device 206, such as into openings 212c and 212e shown in FIG. 23B. The water will then flow into a cavity between the disc member 210 and the first disc device 234. Thereafter the water flows through the indentations 236 and openings 239 shown in FIG. 23B, through spaces between the balls 232 and the openings 235 shown in FIG. 23A, or through further optional openings which may be supplied in the first disc device 234, into a cavity between the first disc device 234 and the second disc device 240. The water thereafter flows out of the swivel device or apparatus 1, through openings, such as openings 249g, 251b, 251c, 249c, and corresponding aligned openings 264g, 266d, 266b, and 264c, shown in FIGS. 23A and 23B. Additional openings, not shown may be provided in the first disc device 234 between walls 248 and ring 254 to allow flow out of openings 251b and 266d, and 251c, and 266b. The flow of water in the manner described cleans dirt, debris, and sand out of the cavity between the first disc device 234 and the second disc device 240 and away from the balls 232 and away from the spacer 230 to allow for continued smooth rotation operation of the mounting device 206 with respect to the combination of the second disc device 240 and the base device 260.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a swivel device comprising:
   a mounting device;
   a base, wherein the mounting device is connected to the base so that the mounting device can rotate with respect to the base;
   a device for keeping a chair stationary on the mounting device, such that when the mounting device rotates with respect to the base, the chair rotates with respect to the base, and when the mounting device does not rotate, with respect to the base, the chair does not rotate with respect to the base;
   a device for aiding rotation of the mounting device with respect to the base; and
   a first member, a second member, and a third member;
wherein the second member is between the first member and the third member;
wherein each of the first member, the second member, and the third member are fixed to the mounting device and protrude out from a first surface of the mounting device;
wherein the first member and the second member together form a first channel which is adapted to receive a leg of the chair such that the first member and the second member inhibit the leg of the chair from sliding;
wherein the second member and the third member together form a second channel which is adapted to receive the leg of the chair such that the second member and the third member inhibit the leg of the chair from sliding;
wherein the mounting device has a back and an opposing front;
wherein the first member, the second member, and the third member are substantially closer to the back than to the opposing front; and
wherein the first channel is part of a flat outer surface of the mounting device, and the second channel is part of the flat outer surface of the mounting device.

2. The apparatus of claim 1 wherein
the swivel device further comprises fourth, fifth, and sixth members;
wherein the fifth member is between the fourth member and the sixth member;
wherein each of the fourth member, the fifth member, and the sixth member are fixed to the mounting device and protrude out from the first surface of the mounting device;
wherein the fourth member and the fifth member together form a third channel which is adapted to receive the leg of the chair such that the fourth member and the fifth member inhibit the leg of the chair from sliding;
wherein the fifth member and the sixth member together form a fourth channel which is adapted to receive the leg of the chair such that the fifth member and the sixth member inhibit the leg of the chair from sliding;
wherein the mounting device has a back and an opposing front; and
wherein the fourth member, the fifth member, and the sixth member are substantially closer to the back than to the opposing front;
wherein the mounting device has a first side and an opposing second side;
wherein the first member, the second member, and the third member are substantially closer to the first side of the mounting device than to the second side of the mounting device; and
and wherein the fourth member, the fifth member, and the sixth member are substantially closer to the second side of the mounting device than to the first side of the mounting device.

* * * * *